(12) United States Patent
Xing

(10) Patent No.: US 9,755,235 B2
(45) Date of Patent: Sep. 5, 2017

(54) EXTREME LONG LIFE, HIGH ENERGY DENSITY BATTERIES AND METHOD OF MAKING AND USING THE SAME

(71) Applicant: ADA Technologies, Inc., Littleton, CO (US)

(72) Inventor: Weibing Xing, Littleton, CO (US)

(73) Assignee: ADA Technologies, Inc., Littleton, CO (US)

( * ) Notice: Subject to any disclaimer, the term of this patent is extended or adjusted under 35 U.S.C. 154(b) by 53 days.

(21) Appl. No.: 14/802,805

(22) Filed: Jul. 17, 2015

(65) Prior Publication Data

US 2016/0365579 A1    Dec. 15, 2016

Related U.S. Application Data

(60) Provisional application No. 62/025,818, filed on Jul. 17, 2014.

(51) Int. Cl.
*H01M 4/583* (2010.01)
*H01M 4/133* (2010.01)
(Continued)

(52) U.S. Cl.
CPC ....... *H01M 4/5835* (2013.01); *H01M 2/1613* (2013.01); *H01M 4/133* (2013.01);
(Continued)

(58) Field of Classification Search
CPC ........... H01M 4/5835; H01M 10/0525; H01M 4/133; H01M 4/622; H01M 2/1613;
(Continued)

(56) References Cited

U.S. PATENT DOCUMENTS 4,681,823 A    7/1987  Tung et al.
5,557,497 A    9/1996  Ivanov et al.
(Continued)

FOREIGN PATENT DOCUMENTS

WO    WO 99/01902    1/1999
WO    WO 2011/098233    8/2011
(Continued)

OTHER PUBLICATIONS

Dai et al., "Surface modified CFx cathode material for ultrafast discharge and high energy density," J. Mater. Chem. A, 2014, vol. 2, pp. 20896-20901, 1 page, abstract only.

(Continued)

*Primary Examiner* — Stewart Fraser
(74) *Attorney, Agent, or Firm* — Sheridan Ross P.C.

(57) ABSTRACT

A composition containing a carbon monofluoride admixture is provided. The carbon monofluoride admixture is generally in the form of layer having opposing upper and lower surfaces. Usually, an ion conducting or a solid electrolyte layer is position on one of the upper or lower layers of the monofluoride admixture. In some configurations, the ion conducting or a solid electrolyte layer can be alkaline metal aluminum oxide or alkaline metal aluminum fluoride. The alkaline metal is commonly lithium, and the alkaline metal aluminum oxide or alkaline metal aluminum fluoride is more commonly $M_zAlX_y$, (M is one of alkali metals, X=O, F), Z commonly can have a value from about 0.5 to about 10 and y can have a value from about 1.75 to about 6.5, more commonly z can have a value from about 1 to about 5 and y can have a value from about 2 to about 4. The carbon monofluoride admixture can include a polymeric binder and one or more of a conductive carbon black and conductive graphite. The carbon monofluoride admixture is generally a (Continued)

component one or more electrodes of an electrochemical energy storage device.

34 Claims, 13 Drawing Sheets

(51) Int. Cl.
  H01M 4/36     (2006.01)
  H01M 4/62     (2006.01)
  H01M 10/052   (2010.01)
  H01M 10/056   (2010.01)
  H01M 2/16     (2006.01)
  H01M 4/66     (2006.01)
  H01M 10/0525  (2010.01)
  H01M 10/0562  (2010.01)

(52) U.S. Cl.
  CPC ........... *H01M 4/366* (2013.01); *H01M 4/622* (2013.01); *H01M 4/625* (2013.01); *H01M 4/661* (2013.01); *H01M 4/662* (2013.01); *H01M 10/052* (2013.01); *H01M 10/056* (2013.01); *H01M 10/0525* (2013.01); *H01M 10/0562* (2013.01)

(58) Field of Classification Search
  CPC .. H01M 10/0562; H01M 4/661; H01M 4/662; H01M 4/625
  See application file for complete search history.

(56) References Cited

U.S. PATENT DOCUMENTS

| | | | |
|---|---|---|---|
| 6,613,383 B1 | 9/2003 | George et al. | |
| 6,713,177 B2 | 3/2004 | George et al. | |
| 6,913,827 B2 | 7/2005 | George et al. | |
| 6,958,174 B1 | 10/2005 | Klaus et al. | |
| 7,081,267 B2 | 7/2006 | Yadav | |
| 7,081,367 B2 | 7/2006 | Shiraishi | |
| 7,132,697 B2 | 11/2006 | Weimer et al. | |
| 7,211,236 B2 | 5/2007 | Stark et al. | |
| 7,396,862 B2 | 7/2008 | Weimer et al. | |
| 7,413,982 B2 | 8/2008 | Levy | |
| 7,426,067 B1 | 9/2008 | Bright et al. | |
| 7,553,686 B2 | 6/2009 | George et al. | |
| 7,658,340 B2 | 2/2010 | Pfeffer et al. | |
| 7,833,437 B2 | 11/2010 | Fan et al. | |
| 8,124,179 B2 | 2/2012 | Nilsen et al. | |
| 8,133,531 B2 | 3/2012 | King et al. | |
| 8,163,336 B2 | 4/2012 | Weimer et al. | |
| 8,187,731 B2 | 5/2012 | Weimer et al. | |
| 8,439,283 B2 | 5/2013 | Pfeffer et al. | |
| 8,531,090 B2 | 9/2013 | Spencer, II | |
| 8,637,156 B2 | 1/2014 | Weimer et al. | |
| 8,735,003 B2 | 5/2014 | Kim et al. | |
| 8,808,901 B2 | 8/2014 | Wang et al. | |
| 8,894,723 B2 | 11/2014 | Nilsen et al. | |
| 8,956,761 B2 | 2/2015 | Reynolds et al. | |
| 8,993,051 B2 | 3/2015 | Kelder et al. | |
| 9,005,816 B2 | 4/2015 | Amine et al. | |
| 9,059,451 B2 | 6/2015 | Xiao et al. | |
| 9,093,707 B2 | 7/2015 | Lee et al. | |
| 9,107,851 B2 | 8/2015 | Dave et al. | |
| 9,243,330 B2 | 1/2016 | Granneman et al. | |
| 9,246,164 B2 | 1/2016 | Lu et al. | |
| 2002/0012844 A1 | 1/2002 | Gan et al. | |
| 2003/0054250 A1 | 3/2003 | Kweon et al. | |
| 2004/0194691 A1 | 10/2004 | George et al. | |
| 2006/0115738 A1 | 6/2006 | Sazhin et al. | |
| 2006/0269834 A1 | 11/2006 | West et al. | |
| 2007/0281089 A1 | 12/2007 | Heller et al. | |
| 2009/0090640 A1 | 4/2009 | Jang et al. | |
| 2009/0214927 A1 | 8/2009 | Dadheech et al. | |
| 2010/0035152 A1 | 2/2010 | Sastry et al. | |
| 2010/0109130 A1 | 5/2010 | Pinna et al. | |
| 2010/0123993 A1 | 5/2010 | Laor | |
| 2010/0178481 A1 | 7/2010 | George et al. | |
| 2010/0273059 A1* | 10/2010 | Sano ............... H01M 4/134 429/231.7 |
| 2010/0310908 A1* | 12/2010 | Zhang ............... H01M 4/364 429/90 |
| 2011/0027658 A1 | 2/2011 | Kim et al. | |
| 2011/0149473 A1 | 6/2011 | Eilertsen et al. | |
| 2011/0184482 A1 | 7/2011 | Eberman et al. | |
| 2011/0236575 A1 | 9/2011 | King et al. | |
| 2011/0311882 A1 | 12/2011 | Kim et al. | |
| 2012/0088164 A1 | 4/2012 | Foster et al. | |
| 2012/0094213 A1 | 4/2012 | Ha et al. | |
| 2012/0121932 A1 | 5/2012 | George et al. | |
| 2012/0126182 A1 | 5/2012 | Zhang et al. | |
| 2012/0145953 A1 | 6/2012 | Pallem et al. | |
| 2012/0161456 A1 | 6/2012 | Riedmayr et al. | |
| 2012/0301778 A1 | 11/2012 | Trevey et al. | |
| 2013/0045328 A1 | 2/2013 | Adzic et al. | |
| 2013/0075647 A1 | 3/2013 | Gadkaree | |
| 2013/0244063 A1 | 9/2013 | Dhar et al. | |
| 2013/0260229 A1 | 10/2013 | Uzun et al. | |
| 2014/0023932 A1 | 1/2014 | Zhang et al. | |
| 2014/0093754 A1 | 4/2014 | Hamers et al. | |
| 2014/0106186 A1 | 4/2014 | Dudney et al. | |
| 2014/0162132 A1 | 6/2014 | Ishii et al. | |
| 2014/0272578 A1 | 9/2014 | Xiao et al. | |
| 2014/0340818 A1 | 11/2014 | Xie et al. | |
| 2015/0037660 A1 | 2/2015 | Bedjaoui et al. | |
| 2015/0064537 A1 | 3/2015 | Christensen et al. | |
| 2015/0152549 A1 | 6/2015 | King et al. | |
| 2015/0162606 A1 | 6/2015 | Kelder et al. | |
| 2015/0180023 A1 | 6/2015 | Xiao et al. | |
| 2015/0194701 A1 | 7/2015 | Kim et al. | |
| 2015/0225853 A1 | 8/2015 | Mantymaki et al. | |
| 2015/0270532 A1 | 9/2015 | Sastry et al. | |
| 2015/0357650 A1 | 12/2015 | Lakshmanan et al. | |

FOREIGN PATENT DOCUMENTS

| | | |
|---|---|---|
| WO | WO 2013/011297 | 1/2013 |
| WO | WO 2015/030407 | 3/2015 |
| WO | WO 2015/106769 | 7/2015 |
| WO | WO 2015/153584 | 10/2015 |
| WO | WO 2015/189284 | 12/2015 |
| WO | WO 2015/197589 | 12/2015 |

OTHER PUBLICATIONS

Elam et al., "Viscous flow reactor with quartz crystal microbalance for thin film growth by atomic layer deposition," Review of Scientific Instruments, vol. 73(8), 2002, pp. 2981-2987.

Glass et al., "Lithium ion conduction in rapidly quenched $Li_2O$—$Al_2O_3$, $Li_2O$—$Ga_2O_3$, and $Li_2O$—$Bi_2O_3$ glasses," Journal of Applied Physics, 1980, vol. 51(7), p. 3756, 1 page, abstract only.

Li et al., "The improved discharge performance of $LiCF_x$ batteries by using multi-walled carbon nanotubes as conductive additive," Journal of Power Sources, 2011, vol. 196, pp. 2246-2250.

Rangasamy et al., "Pushing the Theoretical Limit of $LiCG_x$ Batteries: A tale of Bifunctional Electrolyte," Journal of the American Chemical Society, 2014, vol. 136, pp. 6874-6877.

Read, et al., "LiF Formation and Cathode Swelling in the Li/$CF_x$ Battery," Journal of The Electrochemical Society, 2011, vol. 158(5), pp. A504-A510, 1 page, abstract only.

Wang, et al., "Determination of Chemical Diffusion Coefficient of Lithium Ion in Graphitized Mesocarbon Microbeads with Potential Relaxation Technique," Journal of the Electrochemical Society, 2001, vol. 148(7), pp. A737-A741, 1 page, abstract only.

Zhang et al, "Fluorinated Carbon Composite Cathode for a High Energy Lithium Battery," US Army Rdecom, ARL 08-39, 2011, 9 pages.

Zhang et al., "Electrochemical characteristic and discharge mechanism of a primary Li/$CF_x$ cell," Journal of Power Sources, 2009, vol. 187(1), pp. 233-237, 1 page, abstract only.

(56) References Cited

OTHER PUBLICATIONS

International Search Report and Written Opinion for International Patent Application No. PCT/US15/41002, mailed Oct. 16, 2015, 8 pages.

Aravindan et al. "Atomic layer deposited (ALD)SnO2 anodes with exceptional cycleability for Li-ion batteries," Nano Energy, Sep. 2013, vol. 2, No. 5, pp. 720-725.

Chunmei Ban et al., "Atomic layer deposition of amorphous TiO2 on graphene as an anode for Li-ion batteries," Nanotechnology, 2013, vol. 24, 424002, 6 pages.

Renske Beetstra et al., "Improved Li-ion Battery Performance by Coating Cathode Nano-Particles Using Atomic Layer Deposition," Refereed Proceedings of the 12th International Conference on Fluidization—New Horizons in Fluidization Engineering (2007) pp. 369-376.

Ira Bloom, et al, "Effect of Interface Modifications on Voltage Fade in 0.5Li2MnO3-0.5LiNi0.375Co0.25)2, Cathode Materials," Journal of Power Sources, Mar. 2014, vol. 249, pp. 509-514.

Donders et al. "Atomic Layer Deposition of LiCoO2 Thin-Film Electrodes for All-Solid-State Li-Ion Micro-Batteries," Journal of the Electrochemical Society, 2013, vol. 160, No. 5, pp. A3066-A3071.

Ahn et al, "Extended Lithium Titanate Cycling Potential Window with Near Zero Capacity Loss," Electrochemistry Communications 13 (2011), pp. 796-799.

Xiaogang Han et al., "Atomic-Layer-Deposition Oxide Nanoglue for Sodium Ion Batteries," Nano Letters, Nov. 2013, vol. 14, No. 1, pp. 139-147.

Yu He et al., "Alumina-Coated Patterned Amorphous Silicon as the Anode for a Lithium-Ion Battery with High Coulombic Efficiency," Advanced Materials, Nov. 2011, vol. 23, No. 42, pp. 4938-4941.

Yoon Seok Jung et al, "Effects of Atomic Layer Deposition of Al2O3 on the Li[Li 0.20Mn0.54Ni0.13]O2 Cathode for Lithium-Ion Batteries," Journal of the Electrochemical Society (2011), vol. 158, Issue 12, pp. A1298-A1302.

Yoon Seok Jung et al, "Unexpected Improved Performance of ALO Coated LiCoO2/Graphite Li-ion Batteries," Advanced Energy Materials, Feb. 2013, vol. 3, No. 2, pp. 213-219.

Yoon S. Jung et al., "Enhanced Stability of LiCoO2 Cathodes in Lithium-ion Batteries Using Surface Modification by Atomic Layer Deposition," Journal of the Korean Ceramic Society (2010), vol. 47, No. 1, pp. 61-65.

Yoon S. Jung et al., "Enhanced Stability of LiCoO2 Cathodes in Lithium-Ion Batteries Using Surface Modification by Atomic Layer Deposition," Journal of the Electrochemical Society, 2010, vol. 157, No. 1, A75-A81.

Yoon Seok Jung et al., "Ultrathin Direct Atomic Layer Deposition on Composite Electrodes for Highly Durable and Safe Li-Ion Batteries," Advanced Materials, May 2010, vol. 22, No. 19, pp. 2172-2176.

Eunae Kang et al., "Fe3O4 Nanoparticles Confined in Mesocellular Carbon Foam for High Performance Anode Materials for Lithium-Ion Batteries," Advanced Functional Materials, Jul. 2011, vol. 21, No. 13, pp. 2430-2438.

Hyea Kim et al., "Plasma-Enhanced Atomic Layer Deposition of Ultrathin Oxide Coatings for Stabilized Lithium-Sulfur Batteries," Advanced Energy Materials, Oct. 2013, vol. 3, No. 10, pp. 1308-1315.

Ji Woo Kim et al., "Unexpected High Power Performance of Atomic Layer Deposition Coated Li[Ni1/3Mn1/3C01/3]), Cathodes," Journal of Power Sources, May 2014, vol. 254, pp. 190-197.

Indranil Lahiri et al., "Ultrathin alumina-coated carbon nanotubes as an anode for high capacity Li-ion batteries," Journal of Materials Chemistry, 2011, vol. 21, No. 35, pp. 13621-13626.

Jian-Hong Lee et al., "The effect of TiO2 coating on the electrochemical performance of ZnO nanorod as the anode material for lithium-ion battery," Applied Physics A, Mar. 2011, vol. 102, No. 3, pp. 545-550.

Jyh-Tsung Lee et al, "Low-temperature Atomic Layer Deposited Al2O3 Thin Film on Layer Structure Cathode for Enhanced Cycleability in Lithium-ion Batteries," Electrochimica Acta 55 (2010), pp. 4002-4006.

Kyu Tae Lee et al, "Roles of Surface Chemistry on Safety and Electrochemistry in Lithium Ion Batteries," Acc Chem Res, Apr. 2012, vol. 46, No. 5, pp. 1161-1170.

Meng-Lun Lee et al, Atomic Layer Deposition of TiO2 on Negative Electrode for Lithium Ion Batteries,: Journal of Power Sources, Dec. 2013, vol. 244, pp. 410-416.

Kevin Leung et al, "Using Atomic Layer Deposition to Hinder Solvent Decomposition in Lithium Ion Batteries: First-Principles Modeling and Experimental Studies," Journal of the American Chemical Society (2011), vol. 133, No. 37, pp. 14741-14754.

Juchuan Li et al, "Artificial Solid Electrolyte Interphase to Address the Electrochemical Degradation of Silicon Electrodes," Applied Materials & Interfaces, Jun. 13, 2014, vol. 6, No. 13, pp. 10083-10088.

Xifei Li et al., "Significant impact on cathode performance lithium-ion batteries by precisely controlled metal oxide nanocoatings via atomic layer deposition," Journal of Power Sources, Feb. 2014, vol. 247, pp. 57-69.

Xifei Li et al., "Tin Oxide with Controlled Morphology and Crystallinity by Atomic Layer Deposition onto Graphene Nanosheets for Enhanced Lithium Storage," Advanced Functional Materials, Apr. 2012, vol. 22, No. 8, pp. 1647-1654.

Feng Lin et al., "Chemical and Structural Stability of Lithium-Ion Battery Electrode Materials under Electron Beam," Scientific Reports, Jul. 16, 2014, vol. 4, 5694, 6 pages.

Jian Liu et al., "Ultrathin atomic layer deposited ZrO2 coating to enhance the electrochemical performance of Li4 Ti5O12 as an anode material," Electrochimica Acta 93 (2013), pp. 195-201.

Xiang Bo Meng et al., "Emerging Applications of Atomic Layer Deposition for Lithium-Ion Battery Studies," Advanced Materials, Jul. 2012, vol. 24, No. 27, pp. 3589-3615.

Jagjit Nanda, "Studies on Lithium Manganese Rich MNC Composite Cathodes," Oack Ridge National Laboratory, Project Id #ES106, May 16, 2013. 23 pages.

Daniela Molina Piper et al., "Reversible High-Capacity Si Nanocomposite Anodes for Lithium-ion Batteries Enabled by Molecular Layer Deposition," 224th ECS Meeting, The Electrochemical Society, 2013, Abstract #954.

Leah A. Riley et al., "Electrochemical effects of ALD surface modification on combustion synthesized LiNi1/3Mn1/3O2 as a layered-cathode material," Journal of Power Sources, Mar. 2011, vol. 196, No. 6, pp. 3317-3324.

Hsin-Yi Wang et al, "Electrochemical Investigation of an Artificial Solid Electrolyte Interface for Improving the Cycle-ability of Lithium Ion Batteries using an Atomic Layer Deposition on a Graphite Electrode," Journal of Power Sources, Jul. 2013, vol. 233, pp. 1-5.

Xingcheng Xiao, "Atomic Layer Coating to Mitigate Capacity Fading Associated with Manganese Dissolution in Lithium Ion Batteries," Electrochemistry Communications, Jul. 2013, vol. 32, pp. 31-34.

Xingcheng Xiao et al, "Ultrathin Multifunctional Oxide Coatings for Lithium Ion Batteries," Advanced Materials, Sep. 2011, vol. 23, No. 34, pp. 3911-3915.

Jianqing Zhao et al., "Atomic layer deposition of epitaxial ZrO2 coating on LiMn2O4 nanoparticles for high-rate lithium ion batteries at elevated temperature," Nano Energy, Sep. 2013, vol. 2, No. 5, pp. 882-889.

Jianming Zheng et al, "Mitigating Voltage Fade in Cathode Materials by Improving the Atonic Level Uniformity of Elemental Distribution," Nano Letters, Apr. 2014, vol. 14, No. 5, pp. 2628-2635.

\* cited by examiner

EXTREME LONG LIFE, HIGH ENERGY DENSITY BATTERIES AND METHOD OF MAKING AND USING THE SAME

CROSS REFERENCE

The present application claims the benefits of U.S. Provisional Application Ser. No. 62/025,818, filed Jul. 17, 2014, entitled "Extreme Long Life, High Energy Batteries", which is incorporated herein by this reference in its entirety.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. HQ 0147-14-C-7802 awarded by the Missile Defense Agency.

FIELD

The disclosure relates generally to carbon monofluoride admixtures and methods of making the same, particularly to electrodes and electrochemical storage devices containing carbon monofluoride admixtures and methods of making the same.

BACKGROUND

Electrochemical energy storage devices play important roles in health care, telecommunications, transportation and defense systems. The electrochemical energy storage devices can be a solid state battery, a lithium ion battery, a lithium sulfur battery, a supercapacitor, or a hydrogen fuel cell. Electrochemical storage devices typically have two electrodes, one electrode for discharging electrons generated by a chemical transformation taking place within the device, and another for accepting electrons as they return back to the device after passing through a load electrically interconnect to the electrochemical device. The ability of these electrodes to discharge and accept electrons can affect the electrochemical storage capacity, discharge performance, discharge stability, storage stability, and voltage of the device.

SUMMARY

The various aspects, embodiments, and configurations of the present disclosure address these and other needs. In particular, electrodes having a carbon monofluoride layer are known to have a voltage delay when the electrode having the carbon monofluroide layer is discharged. Having an ion conducting or solid electrolyte layer positioned on at least one of the surfaces of the carbon monofluoride-containing coating substantially reduces, if not eliminates, the voltage delay when the electrode is discharged. Furthermore, having the ion conducting or solid electrolyte layer positioned on at least one of the surfaces of carbon monofluoride layer can one or more of increase cell power capability and achieve higher discharge voltages. The increase in cell power capability, resulting from the elimination of voltage delay and higher discharge voltages, can also eliminate the need for battery 'burn off' and the higher discharge voltages can also provide higher energy and power density, and service lifetimes.

One potential benefit of the one or more ion conductor or solid electrolyte layer as described in some of the embodiments of the present disclosure is that the one or more conformal ion conductor or solid electrolyte layers can function as a barrier to prevent electrolyte solvents from intercalating into the carbon monofluoride layer, which typically leads to undesirable volume expansion typically seen in uncoated carbon monofluoride.

In some embodiments, and configurations of the present disclosure, the ion conducting or solid electrolyte layer can be a metal oxide layer. Having a metal oxide layer positioned on at least one of the surfaces of the carbon monofluoride layer substantially reduces, if not eliminates, the voltage delay when the electrode is discharged. Furthermore, having the metal oxide layer positioned on at least one of the surfaces of carbon monofluoride layer can increase cell power capability, achieve higher discharge voltages or both of increase cell power capability and achieve higher discharge voltages. It can be appreciated that, the metal oxide layer positioned on at least one of the surfaces of the carbon monofluoride-containing coating substantially reduces, if not eliminates, the voltage delay when the electrode is discharged. The increase in cell power capability resulting from the elimination of voltage delay and higher discharge voltages can also eliminate the need for battery 'burn off' and the higher discharge voltages can also provide higher energy and power density, and service lifetimes.

In accordance with some embodiments is a composition having a carbon monofluoride admixture layer having opposing upper and lower surfaces and one or more of an ion conducting layer and a solid electrolyte layer positioned on one of the upper or lower surfaces. The one or more ion conducting and a solid electrolyte layers can be one of a metal oxide, a metal fluoride, a Garnet ion conductor, a sodium super ionic conductor, a lithium super ionic conductor, a sulfide having a lithium super ionic conductor structure, a lithium phosphorous nitrogen ion conductor or a mixture thereof. In some embodiments, the one or more of the ion conducting and the solid electrolyte layers can be one or more of a metal oxide or a metal fluoride selected from the group consisting of an alkali metal aluminum oxide, an alkali metal fluoride, an alkaline earth metal oxide, an alkaline earth fluoride, or a mixture thereof.

Moreover, the one or more of the ion conducting and the solid electrolyte layers can have the following chemical composition: $M_zAlX_y$, where M is one of alkali metal, X is one of oxygen or fluorine and z has a value from about 0.5 to about 10 and y has a value from about 1.75 to about 6.5. In some embodiments, the one of the alkali metal oxide or alkali metal fluoride layers can have the following chemical composition: $Li_xAlO_y$ or $Li_xAlF_y$, where x has a value from about 0.5 to about 10 and y has a value from about 1.75 to about 6.5. In some embodiments, the one or more of the ion conducting and the solid electrolyte layers can have the following chemical composition: $M_zAlX_y$, where M is one of alkali metal, X is one of oxygen or fluorine and where z has a value from about 1 to about 5 and y has a value from about 2 to about 4. It can be appreciated that, the one or more of the ion conducting and the solid electrolyte layers can be an alkali metal aluminum oxide. Moreover, the one or more of the ion conducting and the solid electrolyte layers can be in some embodiments lithium aluminum oxide, $Li_xAlO_y$. In some embodiments, the one or more of the ion conducting and the solid electrolyte layers can have a Li:Al ratio and the Li:Al oxide ratio is selected from the group consisting of: 1:1, 1.5:1, 2:1, 2.5:1, 3:1, 3.5:1, 4:1, 4.5:1 and 5:1. In some embodiments, the one or more of the ion conducting and the solid electrolyte layers can have a Li:Al ratio and the Li:Al ratio can be one of 4:1 and 2:1. Commonly, the one or more of the ion conducting and the solid electrolyte layers can have a thickness from about 1 to about 500 nm, more commonly from about 5 to about 300 nm, or even more commonly from about 10 to about 180.

It can be appreciated that in some embodiments the Garnet solid electrolyte can be $Li_3Ln_3Te_2O_{12}$, where Ln is a lanthanide. Non-limiting example of the Garnet solid electrolyte are $Li_5La_3Ta_2O_{12}$ and $Li_7La_3Zr_2O_{12}$. In some embodiments, the Garnet solid electrolyte can be one or both of $Li_5La_3Ta_2O_{12}$ and $Li_7La_3Zr_2O_{12}$.

It can be appreciated that in some embodiments, the lithium super ionic conductor can be one or more of $Li_2ZnGeO_4$, and $Li_{2+2x}Zn_{1-x}GeO_4$, where x has a value from about −0.36 to about 0.87). In some embodiments, the lithium super ionic can be one or both of $Li_{3.5}Zn_{0.25}GeO_4$ and $Li_{3.4}Si_{0.4}V_{0.6}O_4$.

It can be appreciated that in some embodiments the sulfide having a lithium super ionic conductor structure can be one or more of $Li_{4-x}M_{1-y}M'_yS_4$, where M is one of Si, Ge, or a mixture thereof and where M' is selected from the group consisting of P, Al, Zn, Ga, and a mixture thereof. In some embodiments, the sulfide having a lithium super ionic conductor structure can be $Li_{3.25}Ge_{0.25}P_{0.75}S_4$.

In accordance with some embodiments, the lithium phosphorous nitrogen ion conductor can be $Li_{2.9}PO_{3.3}N_{0.46}$.

In accordance with some embodiments, the carbon monofluoride admixture layer can contain a carbon monofluoride composition, a polymeric binder, and one or both of a conductive carbon black and a conductive graphite. It can be appreciated that the polymeric binder can be, in some embodiments, selected from the group consisting of poly (tetrafluoroethylene), poly(vinylidenefluoride) homopolymer, poly(vinylidenefluoride) co-polymer, styrene-butadiene rubber/carboxymethylcellulose aqueous copolymers, lithium poly(acrylic acid) aqueous polymer, or a mixture thereof. It can be appreciated that the conductive carbon black can be, in some embodiments, selected from the group consisting of carcass grade carbon black, furnace grade carbon black, hard carbon black, soft carbon black, thermal carbon black, acetylenic thermal carbon black, channel black, and lamp black or a mixture thereof. In some embodiments, the conductive graphite can be selected from the group consisting of natural graphite, crystalline flack graphite, amorphous graphite, pyrolytic graphite, graphene, lump graphite, and graphite fiber, or a mixture thereof.

In accordance with some embodiments, the carbon monofluoride admixture layer can have from about 82% to about 98 wt % of the carbon monofluoride composition, from about 1% to about 5 wt % of the conductive carbon black, from about 0% to about 4 wt % of the conductive graphite, and from about 1% to about 9 wt % of the polymeric binder. In some embodiments, the carbon monofluoride admixture layer can have from about 85% to about 95 wt % of the carbon monofluoride composition, from about 2% to about 4 wt % of the conductive carbon black, from about 1% to about 3 wt % of the conductive graphite, and from about 3% to about 7 wt % of the polymeric binder. Moreover, the carbon monofluoride admixture layer can have in some embodiments, about 90 wt % of the carbon monofluoride composition, about 3 wt % of the conductive carbon black, about 2 wt % of the conductive graphite, and about 5 wt % of the polymeric binder.

In some embodiments, the carbon monofluoride composition can have the chemical composition generally depicted by the chemical formula: $CF_x$. Moreover, the value of x can be, in some embodiments, selected from the group consisting of one more of from about 1.01 to about 1.20, from about 1.05 to about 1.11, and about 1.08. In some embodiments, the valve of value of x can be from about 1.01 to about 1.20. In some embodiments, the valve of value of x can be from about 1.05 to about 1.11. In some embodiments, the valve of value of x can be about 1.08.

In some embodiments, the carbon monofluoride composition can have a mean particle size from about 5 to about 11 µm. In some embodiments, the carbon monofluoride composition can have an average surface area from about 110 to about 150 m²/g. In some embodiments, the carbon monofluoride composition can have a mean particle size from about 5 to about 11 µm and an average surface area from about 110 to about 150 m²/g.

In some embodiments, the carbon monofluoride composition can contain one or more metallic constituents. The one or more metallic constituents can be aluminum, copper, iron and nickel. In some embodiments, the one or more metallic constituents alone or in combination can be present in the carbon monofluoride at a level of no more than about 10 ppm.

In accordance with some embodiments is an electrode having a current collector, a carbon monofluoride admixture layer, and one or more of an ion conducting layer and a solid electrolyte layer. In some embodiment the carbon monofluoride admixture layer can be positioned between the current collector the one or more of the ion conducing layer and the solid electrolyte layer. Moreover, the carbon monofluoride admixture layer can be, in some embodiments, in contact with the current collector and the one or more of the ion conducting layer and the solid electrolyte layer.

In some embodiments, the current collector can be one of aluminum, nickel, titanium, stainless steel, carbon coated aluminum, carbon coated nickel, carbon coated titanium, and carbon coated stainless steel.

It can be appreciated that the electrode can be one or more of receives electrons, dispenses electrons, and stores electrons.

In some embodiments, the current collector can be in the form of one of a disk, a rectangle, square, or strip. In some embodiments, the current collector can be in the form of one of a disk, a rectangle, square, strip, or continuous roll. In some embodiments, the current collector can be in the form of one of a disk, a rectangle, square, strip, or a roll.

In some embodiments, the electrode can be configured for an electrochemical energy storage device.

It can be appreciated that the one or more of the ion conducting and the solid electrolyte layers of the electrode can be one of a metal oxide, a metal fluoride, a Garnet ion conductor, a sodium super ionic conductor, a lithium super ionic conductor, a sulfide having a lithium super ionic conductor structure, a lithium phosphorous nitrogen ion conductor or a mixture thereof. Moreover, the one or more of the ion conducting and the solid electrolyte layers can be one or more of a metal oxide or a metal fluoride selected from the group consisting of an alkali metal aluminum oxide, an alkali metal fluoride, an alkaline earth metal oxide, an alkaline earth fluoride, or a mixture thereof. Moreover, the one or more of the ion conducting and the solid electrolyte layers can have the following chemical composition: $M_zAlX_y$, where M is one of alkali metal, X is one of oxygen or fluorine and z has a value from about 0.5 to about 10 and y has a value from about 1.75 to about 6.5. In some embodiments, the one of the alkali metal oxide or alkali metal fluoride layer can have the following chemical composition: $Li_xAlO_y$ or $Li_xAlF_y$ where x has a value from about 0.5 to about 10 and y has a value from about 1.75 to about 6.5. In some embodiments, the one or more of the ion conducting and the solid electrolyte layers can have the following chemical composition: $M_zAlX_y$, where M is one of alkali metal, X is one of oxygen or fluorine and where z has a value from about 1 to about 5 and y has a value from about 2 to about 4. It can be appreciated that, the one or more of the ion conducting and the solid electrolyte layers can be an alkali metal aluminum oxide. Moreover, the one or more of the ion conducting and the solid electrolyte layers can be in some embodiments lithium aluminum oxide, $Li_xAlO_y$. In some embodiments, the one or more of the ion conducting and the solid electrolyte layers can have a Li:Al ratio and the Li:Al oxide ratio is selected from the group consisting of: 1:1, 1.5:1, 2:1, 2.5:1, 3:1, 3.5:1, 4:1, 4.5:1 and 5:1. In some embodiments, the one or more of the ion conducting and the solid electrolyte layers can have a Li:Al ratio and the Li:Al ratio can be one of 4:1 and 2:1. Commonly, the one or more of the ion conducting and the solid electrolyte layer can have a thickness from about 1 to about 500 nm, more commonly from about 5 to 100 nm, or even more commonly from about 10 to about 180 nm. It can be appreciated that in some embodiments the Garnet solid electrolyte can be $Li_3Ln_3Te_2O_{12}$, where Ln is a lanthanide. Non-limiting example of the Garnet solid electrolyte are $Li_5La_3Ta_2O_{12}$ and $Li_7La_3Zr_2O_{12}$. In some embodiments, the Garnet solid electrolyte can be one or both of $Li_5La_3Ta_2O_{12}$ and $Li_7La_3Zr_2O_{12}$. It can be appreciated that in some embodiments, the lithium super ionic conductor can be one or more of $Li_2ZnGeO_4$, and $Li_{2+2x}Zn_{1-x}GeO_4$, where x has a value from about −0.36 to about 0.87. In some embodiments, the lithium super ionic can be one or both of $Li_{3.5}Zn_{0.25}GeO_4$ and $Li_{3.4}Si_{0.4}V_{0.6}O_4$. It can be appreciated that in some embodiments the sulfide having a lithium super ionic conductor structure can be one or more of $Li_{4-x}M_{1-y}M'_yS_4$, where M is one of Si, Ge, or a mixture thereof and where M' is selected from the group consisting of P, Al, Zn, Ga, and a mixture thereof. In some embodiments, the sulfide having a lithium super ionic conductor structure can be $Li_{3.25}Ge_{0.25}P_{0.75}S_4$. In accordance with some embodiments, the lithium phosphorous nitrogen ion conductor can be $Li_{2.9}PO_{3.3}N_{0.46}$.

It can be appreciated that the carbon monofluoride admixture layer of the electrode can contain a carbon monofluoride composition, a polymeric binder, and one or both of a conductive carbon black and a conductive graphite. In some embodiments, the polymeric binder can be selected from the group consisting of poly(tetrafluoroethylene), poly(vinylidenefluoride) homopolymer, poly(vinylidenefluoride) co-polymer, styrene-butadiene rubber/carboxymethylcellulose aqueous copolymers, lithium poly(acrylic acid) aqueous polymer, or a mixture thereof. In some embodiments, the conductive carbon black can be selected from the group consisting of carcass grade carbon black, furnace grade carbon black, hard carbon black, soft carbon black, thermal carbon black, acetylenic thermal carbon black, channel black, and lamp black or a mixture thereof. In some embodiments, the conductive graphite can be selected from the group consisting of natural graphite, crystalline flack graphite, amorphous graphite, pyrolytic graphite, graphene, lump graphite, and graphite fiber, or a mixture thereof. In accordance with some embodiments, the carbon monofluoride admixture layer can have from about 82% to about 98 wt % of the carbon monofluoride composition, from about 1% to about 5 wt % of the conductive carbon black, from about 0% to about 4 wt % of the conductive graphite, and from about 1% to about 9 wt % of the polymeric binder. In some embodiments, the carbon monofluoride admixture layer can have from about 85% to about 95 wt % of the carbon monofluoride composition, from about 2% to about 4 wt % of the conductive carbon black, from about 1% to about 3 wt % of the conductive graphite, and from about 3% to about 7 wt % of the polymeric binder. Moreover, the carbon monofluoride admixture layer can have in some embodiments, about 90 wt % of the carbon monofluoride composition, about 3% wt % of the conductive carbon black, about 2 wt % of the conductive graphite, and about 5 wt % of the polymeric binder. In some embodiments, the carbon monofluoride composition can have the chemical composition generally depicted by chemical formula: $CF_x$. Moreover, the value of x can be, in some embodiments, selected from the group consisting of one more of from about 1.01 to about 1.20, from about 1.05 to about 1.11, and about 1.08. In some embodiments, the valve of value of x can be from about 1.01 to about 1.20. In some embodiments, the valve of value of x can be from about 1.05 to about 1.11. In some embodiments, the valve of value of x can be about 1.08. In some embodiments, the carbon monofluoride composition can have a mean particle size from about 5 to about 11 µm. In some embodiments, the carbon monofluoride composition can have an average surface area from about 110 to about 150 $m^2$/g. In some embodiments, the carbon monofluoride composition can have a mean particle size from about 5 to about 11 µm and an average surface area from about 110 to about 150 $m^2$/g. In some embodiments, the carbon monofluoride composition can contain one or more metallic constituents. The one or more metallic constituents can be aluminum, copper, iron and nickel. In some embodiments, the one or more metallic constituents alone or in combination can be present in the carbon monofluoride at a level of no more than about 10 ppm.

In accordance with some embodiments is a device having first and second electrodes, a separator positioned between the first and second electrodes, and an electrolyte in contact with the first and second electrodes and the separator. In some embodiments, one or both of the first and second electrodes can have a current collector, a carbon monofluoride admixture layer, and one or more of an ion conducting layer and a solid electrolyte layer, where the carbon monofluoride admixture layer can be positioned between the current collector and the one or more of the ion conducting layer and the solid electrolyte layers, and where the carbon monofluoride admixture layer can be in contact with the current collector and the one or more of the ion conducting layer and the solid electrolyte layer.

In some embodiments, the separator can selected from the group consisting of polymer films including polyolefin such as polyethylene, polypropylene, poly(tetrafluoroethylene), polyvinyl chloride, nonwoven fibers including cotton, nylon, polyesters, glass, and naturally occurring substances including rubber, asbestos, and wood, or a mixture thereof. In some embodiments, the separator can have a coating layer. In some embodiments, the coating layer and the one or more of the ion conducting layer and the solid electrolyte layers can have substantially the same chemical composition.

In some embodiments, the electrolyte can be a lithium ion electrolyte. In some embodiments, the lithium ion electrolyte can be selected the group consisting of a non-aqueous electrolyte, an aprotic liquid electrolyte, a room temperature ionic liquid electrolyte, a polymeric electrolyte, a polymeric gel electrolyte, a solid state electrolyte, or a mixture thereof.

In accordance with some embodiments the one or both of the first and second electrodes can have an electrode having a current collector, a carbon monofluoride admixture layer, and one or more of an ion conducting layer and a solid electrolyte layer. In some embodiment the carbon monofluoride admixture layer can be positioned between the current collector the one or more of the ion conducing layer and the solid electrolyte layer. Moreover, carbon monofluoride admixture layer can be, in some embodiments, in contact with the current collector and the one or more of the ion conducting layers and the solid electrolyte layer. In some embodiments, the current collector can be one of aluminum, nickel, titanium, stainless steel, carbon coated aluminum, carbon coated nickel, carbon coated titanium, and carbon coated stainless steel. It can be appreciated that one or both of first and second electrodes can be one or more of receive electrons, dispense electrons, and store electrons. In some embodiments, the current collector can be in the form of one of a disk, a rectangle, square, or strip. In some embodiments, the current collector can be in the form of one of a disk, a rectangle, square, strip, or continuous roll. In some embodiments, the current collector can be in the form of one of a disk, a rectangle, square, strip, or a roll. In some embodiments, the first and second electrodes can be configured for an electrochemical energy storage device.

It can be appreciated that the one or more of the ion conducting and the solid electrolyte layers of one or both the first and second electrodes can be one of a metal oxide, a metal fluoride, a Garnet ion conductor, a sodium super ionic conductor, a lithium super ionic conductor, a sulfide having a lithium super ionic conductor structure, a lithium phosphorous nitrogen ion conductor or a mixture thereof. Moreover, the one or more of the ion conducting and the solid electrolyte layers can be one or more of a metal oxide or a metal fluoride selected from the group consisting of an alkali metal aluminum oxide, an alkali metal fluoride, an alkaline earth metal oxide, an alkaline earth fluoride, or a mixture thereof. Moreover, the one or more of the ion conducting and the solid electrolyte layers can have the following chemical composition: $M_zAlX_y$, where M is one of alkali metal, X is one of oxygen or fluorine and z has a value from about 0.5 to about 10 and y has a value from about 1.75 to about 6.5. In some embodiments, the one of the alkali metal oxide or alkali metal fluoride layer can have the following chemical composition: $Li_xAlO_y$ or $Li_xAlF_y$ where x has a value from about 0.5 to about 10 and y has a value from about 1.75 to about 6.5. In some embodiments, the one or more of the ion conducting and the solid electrolyte layers can have the following chemical composition: $M_zAlX_y$, where M is one of alkali metal, X is one of oxygen or fluorine and where z has a value from about 1 to about 5 and y has a value from about 2 to about 4. It can be appreciated that, the one or more of the ion conducting and the solid electrolyte layers can be an alkali metal aluminum oxide. Moreover, one or more of the ion conducting and the solid electrolyte layers can be in some embodiments lithium aluminum oxide, $LiAlO_x$. In some embodiments, the one or more of the ion conducting and the solid electrolyte layers can have a Li:Al ratio and the Li:Al oxide ratio is selected from the group consisting of: 1:1, 1.5:1, 2:1, 2.5:1, 3:1, 3.5:1, 4:1, 4.5:1 and 5:1. In some embodiments, the one or more of the ion conducting and the solid electrolyte layers can have a Li:Al ratio and the Li:Al ratio can be one of 4:1 and 2:1. In some embodiments, the one or more of the ion conducting and the solid electrolyte layers can have a thickness from about 10 to about 180 nm. It can be appreciated that in some embodiments the Garnet solid electrolyte can be $Li_3Ln_3Te_2O_{12}$, where Ln is a lanthanide. Non-limiting example of the Garnet solid electrolyte are $Li_5La_3Ta_2O_{12}$ and $Li_7La_3Zr_2O_{12}$. In some embodiments, the Garnet solid electrolyte can be one or both of $Li_5La_3Ta_2O_{12}$ and $Li_7La_3Zr_2O_{12}$. It can be appreciated that in some embodiments, the lithium super ionic conductor can be one or more of $Li_2ZnGeO_4$, and $Li_{2+2x}Zn_{1-x}GeO_4$, where x has a value from about −0.36 to about 0.87). In some embodiments, the lithium super ionic can be one or both of $Li_{3.5}Zn_{0.25}GeO_4$ and $Li_{3.4}Si_{0.4}V_{0.6}O_4$. It can be appreciated that in some embodiments the sulfide having a lithium super ionic conductor structure can be one or more of $Li_{4-x}M_{1-y}M'_yS_4$, where M is one of Si, Ge, or a mixture thereof and where M' is selected from the group consisting of P, Al, Zn, Ga, and a mixture thereof. In some embodiments, the sulfide having a lithium super ionic conductor structure can be $Li_{3.25}Ge_{0.25}P_{0.75}S_4$. In accordance with some embodiments, the lithium phosphorous nitrogen ion conductor can be $Li_{2.9}PO_{3.3}N_{0.46}$.

It can be appreciated that the carbon monofluoride admixture layer of one or both of the first and second electrodes can contain a carbon monofluoride composition, a polymeric binder, and one or both of a conductive carbon black and a conductive graphite. In some embodiments, the polymeric binder can be selected from the group consisting of poly (tetrafluoroethylene), poly(vinylidenefluoride) homopolymer, poly(vinylidenefluoride) co-polymer, styrene-butadiene rubber/carboxymethylcellulose aqueous copolymers, lithium poly(acrylic acid) aqueous polymer, or a mixture thereof. In some embodiments, the conductive carbon black can be selected from the group consisting of carcass grade carbon black, furnace grade carbon black, hard carbon black, soft carbon black, thermal carbon black, acetylenic thermal carbon black, channel black, and lamp black or a mixture thereof. In some embodiments, the conductive graphite can be selected from the group consisting of natural graphite, crystalline flack graphite, amorphous graphite, pyrolytic graphite, graphene, lump graphite, and graphite fiber, or a mixture thereof. In accordance with some embodiments, the carbon monofluoride admixture layer can have from about 82% to about 98 wt % of the carbon monofluoride composition, from about 1% to about 5 wt % of the conductive carbon black, from about 0% to about 4 wt % of the conductive graphite, and from about 1% to about 9 wt % of the polymeric binder. In some embodiments, the carbon monofluoride admixture layer can have from about 85% to about 95 wt % of the carbon monofluoride composition, from about 2% to about 4 wt % of the conductive carbon black, from about 1% to about 3 wt % of the conductive graphite, and from about 3% to about 7 wt % of the polymeric binder. Moreover, the carbon monofluoride admixture layer can have in some embodiments, about 90 wt % of the carbon monofluoride composition, about 3 wt % of the conductive carbon black, about 2 wt % of the conductive graphite, and about 5 wt % of the polymeric binder. In some embodiments, the carbon monofluoride composition can be $CF_x$. Moreover, the value of x can be, in some embodiments, selected from the group consisting of one more of from about 1.01 to about 1.20, from about 1.05 to about 1.11, and about 1.08. In some embodiments, the valve of value of x can be from about 1.01 to about 1.20. In some embodiments, the valve of value of x can be from about 1.05 to about 1.11. In some embodiments, the valve of value of x can be about 1.08. In some embodiments, the carbon monofluoride composition can have a mean particle size from about 5 to about 11 μm. In some embodiments, the carbon monofluoride composition can have an average surface area from about 110 to about 150 m²/g. In some embodiments, the carbon monofluoride composition can have a mean particle size from about 5 to about 11 μm and an average surface area from about 110 to about 150 m²/g. In some embodiments, the carbon monofluoride composition can contain one or more metallic constituents. The one or more metallic constituents can be aluminum, copper, iron and nickel. In some embodiments, the one or more metallic constituents alone or in combination can be present in the carbon monofluoride at a level of no more than about 10 ppm.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The accompanying drawings are incorporated into and form a part of the specification to illustrate several examples of the present invention(s). These drawings, together with the description, explain the principles of the invention(s). The drawings simply illustrate preferred and alternative examples of how the invention(s) can be made and used and are not to be construed as limiting the invention(s) to only the illustrated and described examples.

Further features and advantages will become apparent from the following, more detailed, description of the various embodiments of the invention(s), as illustrated by the drawings referenced below.

DETAILED DESCRIPTION

Figure 1A:
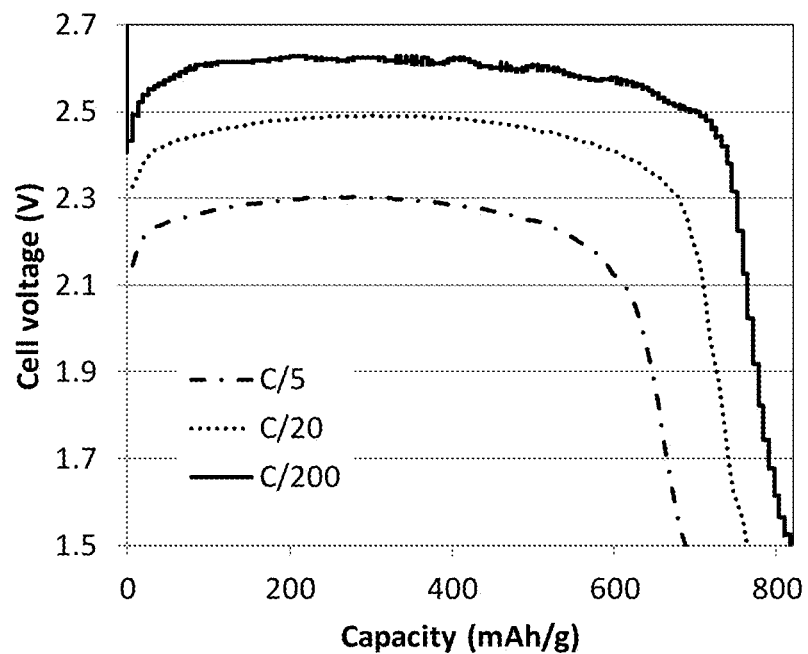
FIG. 1A depicts a discharge profile according to some embodiments of the present disclosure.

In accordance with some embodiments, is a coating composition containing a carbon monofluoride admixture layer having opposing upper and lower surfaces and one or more an ion conducting or solid electrolyte layers positioned on one of the upper or lower surfaces of the carbon monofluoride admixture layer. Some embodiments of the present disclosure include an electrode having the coating composition positioned on a current collector with the carbon monofluoride admixture layer positioned between the current collector and the one or more of ion conducting and solid electrolyte layers. The one or more of the ion conductor and solid electrolyte layer is generally one or more of a metal oxide, a metal fluoride, a Garnet ion conductor, a sodium super ionic conductor, a lithium super ionic conductor, a sulfide with a lithium super ionic conductor-related structure, and a lithium phosphorous oxygen nitrogen ion conductor. More specifically, the metal oxide can be one or more of alkali and alkaline earth aluminum oxide. More specifically, the metal oxide or fluoride is an alkali metal aluminum oxide or fluoride, alkaline earth metal oxide or fluoride, or a mixture thereof. Still more specifically, the metal oxide or fluoride can be presented by the following chemical formula: $M_zAlX_y$, where M is one of alkali metal, X is oxygen or fluorine and z commonly can have a value from about 0.5 to about 10 and y can have a value from about 1.75 to about 6.5; more commonly z can have a value from about 1 to about 5 and y can have a value from about 2 to about 4. It can be appreciated that alkali metal can be selected from the group consisting of lithium, sodium, potassium, rubidium, and cesium. Generally, the alkali metal can be one or more lithium sodium, and potassium. More generally, the alkali metal is lithium. Non-limiting examples of a Garnet solid electrolyte include $Li_3Ln_3Te_2O_{12}$ (Ln is a lanthanide or rare earth metal), $Li_5La_3Ta_2O_{12}$, $Li_7La_3Zr_2O_{12}$. Non-limiting examples of a lithium super ionic conductor solid electrolyte includes $Li_2ZnGeO_4$, $Li_{2+2x}Zn_{1-x}GeO_4$ (−0.36<x<0.87), with $Li_{3.5}Zn_{0.25}GeO_4$ and $Li_{3.4}Si_{0.4}V_{0.6}O_4$ being two specific examples. Non-limiting examples of a sulfide with a lithium super ionic conductor-related structure solid electrolyte includes $Li_{4-x}M_{1-y}M'_yS_4$ (where M can be Si or Ge and M' can be Al, Zn, or Ga), with $Li_{3.25}Ge_{0.25}P_{0.75}S_4$ being a specific example. While not wanting to be limited by example, a lithium phosphorous oxygen nitrogen ion conductor solid electrolyte can include $Li_{2.9}PO_{3.3}N_{0.46}$.

In accordance with some embodiments is a coating composition containing a carbon monofluoride admixture layer having opposing upper and lower surfaces and one or more a metal oxide layer positioned on one of the upper or lower surfaces of the carbon monofluoride admixture layer. Some embodiments of the present disclosure include an electrode having the coating composition positioned on a current collector with the carbon monofluoride admixture layer positioned between the current collector and the metal oxide layer. It can be appreciated that the carbon monofluoride admixture layer is in contact with the metal oxide layer and the current collector. Moreover, the coating composition positioned on the current collector can be the form of a conformal electrode coating. The conformal electrode coating can be applied to an anode, a cathode, or both of the anode and cathode of an electrochemical storage device. Generally, the conformal coating is applied to the cathode of an electrochemical storage device.

The metal oxide of the metal oxide layer is generally one of an alkali metal aluminum oxide, alkaline earth metal oxide or a mixture thereof. Specifically, the metal oxide of the metal oxide layer can be an alkali metal aluminum oxide. It can be appreciated that the alkali metal can be selected from the group consisting of sodium, lithium, rubidium, and cesium. Generally, the alkali metal can be one or more of sodium, lithium and potassium. More generally, the alkali metal is lithium. The lithium aluminum oxide can be represented by the following chemical formula: $Li_xAlO_y$, where x commonly can have a value from about 0.5 to about 10 and y can have a value from about 1.75 to about 6.5; more commonly x can have a value from about 1 to about 5 and y can have a value from about 2 to about 4.

One advantage that the coating composition can achieve is a substantial reduction, if not elimination, of the characteristic voltage delay typically seen with carbon monofluoride systems of the prior art. A benefit of the reduction, or elimination, of the voltage delay is significantly increased electrochemical cell power capability.

Electrochemical cells having one or more electrodes coated with the coating composition of the present invention typically have more than about 3%, more typically more than about 5%, even more typically more than about 10%, yet even more typically more than about 15%, or still yet even more typically more than about 20% electrochemical cell power capability than electrochemical energy storage cells of prior art. Moreover, electrochemical cells having one or more coated electrodes coated with conformal coating composition of the present invention commonly have more than about 3%, more typically more than about 5%, even more typically more than about 10%, yet even more typically more than about 15%, or still yet even more typically more than about 20% electrochemical cell power capability than electrochemical energy storage cells of prior art.

Another advantage of the coating composition and electrodes coated therewith, particularly for electrodes having a conformal coating composition is a substantially higher discharge voltage than electrochemical cells of the prior art. Accordingly, the coating composition and electrodes coated therewith can achieve a higher energy, higher power densities, longer service lifetimes and combinations thereof than electrochemical cells of the prior art.

As used herein, carbon monofluoride generally refers to chemical compositions commonly represented by one or more of the following chemical formulae: CF, $CF_x$ and $(CF)_x$. Usually, x can have a value from about 0.8 to about 1.3, more usually from about 0.9 to about 1.2, even more usually from about 1.0 to about 1.16, yet even more commonly from about 1.03 to about 1.13, or still yet even more commonly about 1.08. The carbon monofluoride typically has a surface area from about 75 to about 185 $m^2/g$, more typically from about 100 to about 160 $m^2/g$, yet more typically from about 110 to about 150 $m^2/g$, still yet more typically from about 120 to about 140 $m^2/g$, or yet still more typically about 130 $m^2/g$. The carbon monofluoride can routinely be in the form of particles. More routinely, the carbon monofluoride can be in the form of particles having an average particle size from about 0.5 to about 50 μm, even more routinely from about 1 to about 30 μm, yet even more routinely from about 3 to about 15 μm, or still yet even more routinely about 8 μm. Generally, the carbon monofluoride has no more than about 10 ppm aluminum, more generally no more than about 5 ppm aluminum, yet generally no more than about 3 ppm aluminum, or still yet even more generally no more than about 1 ppm aluminum. Commonly, the carbon monofluoride has no more than about 10 ppm copper, more commonly no more than about 5 ppm copper, yet commonly no more than about 3 ppm copper, or still yet even more commonly no more than about 1 ppm copper. Typically, the carbon monofluoride has no more than about 10 ppm iron, more typically no more than about 5 ppm iron, yet typically no more than about 3 ppm iron, or still yet even more typically no more than about 1 ppm iron. Usually, the carbon monofluoride has no more than about 10 ppm nickel, more usually no more than about 5 ppm nickel, yet usually no more than about 3 ppm nickel, or still yet even more usually no more than about 1 ppm nickel. Routinely, the carbon monofluoride has a trace metal content of no more than about 15 ppm, more routinely no more than about 10 ppm, yet routinely no more than about 5 ppm, still yet even more routinely no more than about 3 ppm, or yet still even more routinely no more than about 1 ppm trace metal. The trace metal content of the carbon monofluoride is the sum of aluminum, copper, iron and nickel contained in the carbon monofluoride. Those of skill in art also refer to carbon monofluoride as polycarbon monofluoride, polycarbon fluoride, poly(carbon monofluoride) and graphite fluoride. It can be appreciated that, fluorographene (also know to those of skill in art as perfluorographane and grapheme fluoride) can be considered carbon monofluorides as they can be represented by the general chemical formula of $-(CF)_n-$, which is a poly(carbon monofluoride) having covalent C—F bonds and buckled $sp^3$ carbon sheets six-member carbon rings in a chair, as opposed to a boat, configuration. Poly(carbon monofluoride) is synthesized by direct fluorination of graphite using elemental fluorine above 623 degrees Kelvin.

The carbon monofluoride is generally mixed with one or materials to form a carbon monofluoride admixture. Stated another way, the carbon monofluoride admixture comprises a mixture of carbon monofluoride and one or more materials. The carbon monofluoride admixture typically comprises, in addition to carbon monofluoride, one or more of conductive carbon black, conductive graphite and a polymeric binder. Commonly, the carbon monofluoride content of the carbon monofluoride admixture is no more than about 100 wt %, more commonly no more than about 99 wt %, even more generally no more than about 98 wt %, yet even more commonly no more than about 97 wt %, still yet even more commonly no more than about 96 wt %, still yet even more commonly no more than about 95 wt %, still yet even more commonly no more than about 94 wt %, still yet even more commonly no more than about 93 wt %, still yet even more commonly no more than about 92 wt %, still yet even more commonly no more than about 91 wt %, still yet even more commonly no more than about 90 wt %, still yet even more commonly no more than about 89 wt %, still yet even more commonly no more than about 88 wt %, still yet even more commonly no more than about 87 wt %, still yet even more commonly no more than about 86 wt %, still yet even more commonly no more than about 85 wt %, still yet even more commonly no more than about 84 wt %, still yet even more commonly no more than about 83 wt %, still yet even more commonly no more than about 82 wt %, still yet even more commonly no more than about 81 wt %, or yet still even more commonly no more than about 80 wt %. Typically, the conductive carbon black content of the carbon monofluoride admixture is no more than about 10 wt %, more typically no more than about 9 wt %, even more typically no more than about 8 wt %, yet even more typically no more than about 7 wt %, still yet even more typically no more than about 6 wt %, still yet even more typically no more than about 5 wt %, still yet even more typically no more than about 4 wt %, still yet even more typically no more than about 3 wt %, still yet even more typically no more than about 2 wt %, still yet even more typically no more than about 1 wt %, or yet still even more typically no more than about 0.01 wt % of the conductive carbon black. It can be appreciated that in some embodiments the carbon monofluoride admixture is devoid of the conductive carbon black.

Generally, the conductive graphite content of the carbon monofluoride admixture is no more than about 10 wt %, more generally no more than about 9 wt %, even more generally no more than about 8 wt %, yet even more generally no more than about 7 wt %, still yet even more generally no more than about 6 wt %, still yet even more generally no more than about 5 wt %, still yet even more generally no more than about 5 wt %, still yet even more generally no more than about 4 wt %, still yet even more generally no more than about 3 wt %, still yet even more generally no more than about 2 wt %, still yet even more generally no more than about 1 wt %, or yet still even more generally no more than about 0.01 wt % of the conductive graphite. It can be appreciated that in some embodiments the carbon monofluoride admixture is devoid of the conductive graphite.

Usually, the polymeric binder content of the carbon monofluoride admixture is no more than about 20 wt %, more usually no more than about 19 wt %, even more usually no more than about 18 wt %, yet even more usually no more than about 17 wt %, still yet even more usually no more than about 16 wt %, still yet even more usually no more than about 15 wt %, still yet even more usually no more than about 14 wt %, still yet even more usually no more than about 13 wt %, still yet even more usually no more than about 12 wt %, still yet even more usually no more than about 11 wt %, still yet even more usually no more than about 10 wt %, still yet even more usually no more than about 9 wt %, still yet even more usually no more than about 8 wt %, still yet even more usually no more than about 7 wt %, still yet even more usually no more than about 6 wt %, still yet even more usually no more than about 5 wt %, still yet even more usually no more than about 4 wt %, still yet even more usually no more than about 3 wt %, still yet even more usually no more than about 2 wt %, still yet even more usually no more than about 1 wt %, or yet still even more usually no more than about 0.5 wt % of the polymeric binder.

The conductive carbon black can be carcass grade carbon black, furnace grade carbon black, hard carbon black, soft carbon black, thermal carbon black, acetylenic thermal carbon black, channel black, and lamp black or a mixture thereof.

The conductive graphite can be natural graphite, crystalline flack graphite, amorphous graphite, pyrolytic graphite, graphene, lump graphite, and graphite fiber, or a mixture thereof.

The polymer binder can be poly(tetrafluoroethylene), poly(vinylidenefluoride) based homo- or co-polymer, styrene-butadiene rubber/carboxymethylcellulose aqueous copolymers, lithium poly(acrylic acid) aqueous polymer, or a mixture thereof.

A coated electrode can be fabricated by coating a current collector with the coating composition. The carbon monofluoride admixture can be coated on the current collector by any coating process known with the art for applying liquid, paste or powder compositions to solid substrate. Non-limiting examples of such coating processes are drawdown methods, brush and roller applying methods, kiss-wheel methods, spray application methods, curtain coating methods, screen printing methods, and combinations thereof to name a few. The applied carbon monofluoride admixture layer is generally dried, and optionally cured, before applying a metal oxide layer on top of the carbon monofluoride admixture layer. The metal oxide layer can be applied by any suitable method for depositing metal oxide layers to a substrate. Some of the suitable methods of applying the metal oxide layer to the carbon monofluoride layer are described below in the Example section; however, the electrode composition is not limited by to the methods described herein for coating the current collector with the carbon monofluoride admixture nor by the methods described herein for coating the carbon monofluoride layer with a layer of metal oxide.

As used herein, conformal coating generally refers to an electrode and/or separator coated with an ion conductor, solid electrolyte or a combination thereof. The electrode can be and an anode and/or a cathode.

EXAMPLES

As used herein the term "lithium ion coin cell" generally refers a cell having lithium ion cations, more generally refers to a cell having lithium ion cations and a lithium metal anode, still more generally refers to a non-rechargeable, primary cell having lithium ion cations and a lithium metal anode.

Example 1

Figure 1B:
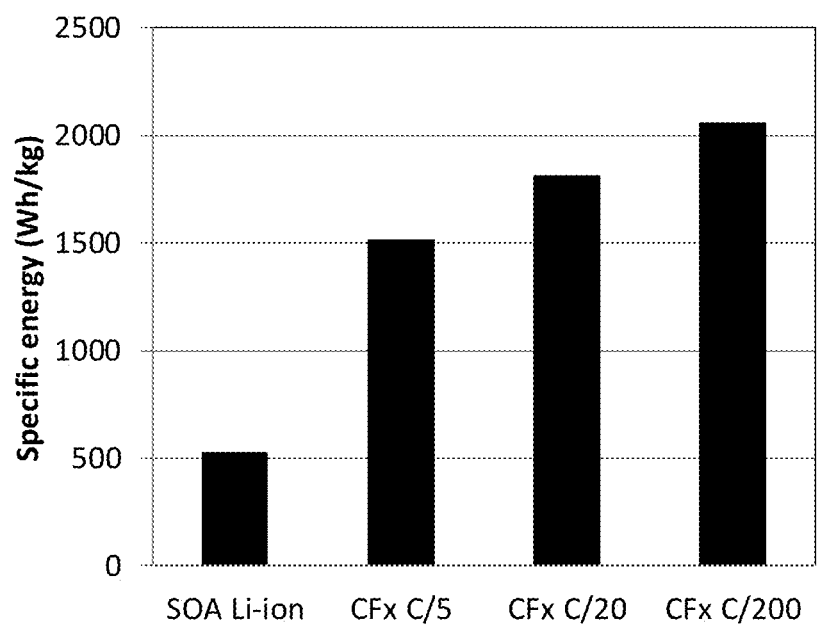
FIG. 1B depicts a specific energy profile according to some embodiments of the present disclosure.

Carbon monofluoride (Carbofluor 1000, Advance Research Chemicals, Inc) was mixed with conductive carbon black, conductive graphite and a polymeric binder to form a mixture. The polymeric binder was 10 wt % of the mixture. An organic solvent was added to the mixture to form a slurry. The slurried mixture was cast onto aluminum foil and dried. After drying the cast film, the dried cast film on the aluminum foil current collector was evaluated as a cathode opposite a lithium metal anode in a 2032 lithium ion coin cell configuration. FIG. 1A displays voltage profiles of lithium ion coin cell discharged at C/5, C/20 and C/200 rates, respectively, corresponding to discharge current densities of 175, 44, and 4.4 mA/g. FIG. 1B shows specific energy profiles of the lithium ion coin cell at tested discharge rates. The specific energy at C/200 for the lithium ion coin cell is about four times greater (>2000 Wh/kg) than that of state-of-the-art lithium ion cathodes (530 Wh/kg). While specific energy at C/5 is still quite high, the coin cell experiences significant polarization and voltage delay which limits usefulness in many applications.

Figure 2A:
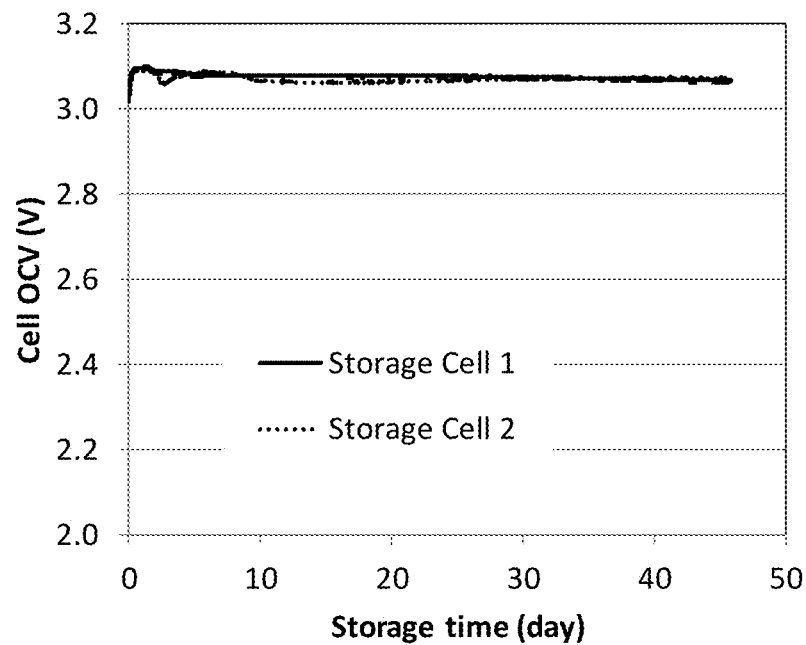
FIG. 2A depicts open current potential versus storage time according to some embodiments of present disclosure, where OCV stands for open-circuit voltage.
Figure 2B:
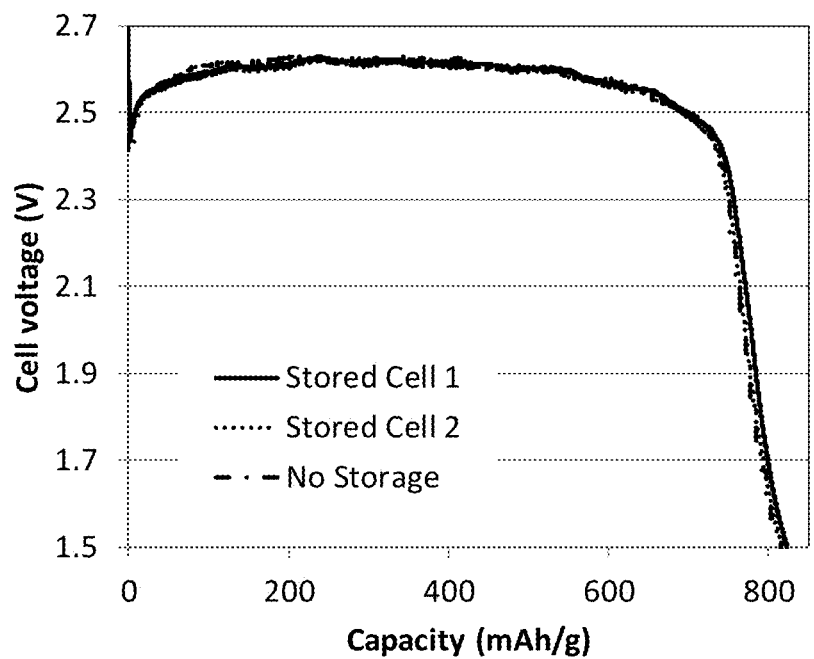
FIG. 2B depicts discharge profiles after 45 days storage at room temperature according to some embodiments of the present disclosure.

FIG. 2A shows room temperature open circuit voltage of the lithium ion coin cell as a function of storage time. FIG. 2B shows discharge profiles versus coin cell capacity for stored and fresh, non-stored coin cells; the stored coin cells were stored for a period of 45 days. The stored cells showed no capacity loss compared with the freshly discharged cell, both of which were discharged at a C/200 rate. Although limited to a very short window of time for preliminary tests compared to the 20-year requirement, the performance trend indicated electrochemical stability of the 2032 lithium ion coin cell after 45 days of storage and was consistent with its known shelf stability in commercial cells. While the stability of 2032 lithium ion coin cell was relatively high, it still suffered from a small amount of self-discharge. Some of the self-discharge current can be attributed to side reactions at the cathode-electrolyte interface. Stability requires a small amount of decomposition to form a passivation layer on the anode's surface. This passive layer can be quite robust, but can break down over time, especially at high temperatures. While a self-discharge current in a liquid electrolyte cell can be quite low, it may be on the same order of magnitude as the average useable current delivered over twenty years. It is believed that a solid electrolyte could improve cell stability.

Example 2

A coated electrode was fabricated by coating a current collector with a carbon monofluoride admixture. The carbon monofluoride admixture typically comprises, in addition to carbon monofluoride, one or more of conductive carbon black, conductive graphite and a polymeric binder. The carbon monofluoride admixture contained 90 wt % carbon monofluoride, 3 wt % conductive carbon black, 2 wt %, conductive graphite and 5 wt % polymeric binder. The carbon monofluoride, conductive carbon black, conductive graphite, and polymeric binder were blended with a vortex mixer. After blending with the vortex mixer, an organic solvent was added and slurried with a homogenizer. An aluminum current collector was coated with the slurried mixture and dried in an oven at 80 degrees Celsius overnight. Disks were cut from the dried electrodes using a 1.2 mm diameter die and were used for adhesion and electrochemical evaluations.

The carbon monofluoride was battery grade, petroleum coke based carbon monofluoride (Carbofluor 1000, Advanced Research Chemicals, Inc., Catoosa, Okla., USA). The carbon monofluoride was slurried. The slurried carbon monofluoride applied as coating on an electrode using an experimental design methodology. The experimental design methodology used varied the carbon monofluoride, conductive carbon, graphite, additives, and binders. Dry powder vortex processing and wet slurry mixing were used to control electrode material loading, and coating porosity and adhesion properties.

Figure 3A:
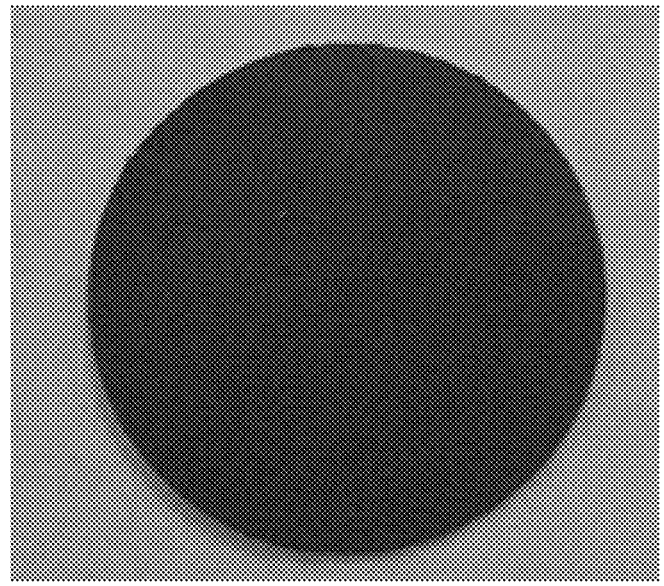
FIG. 3A depicts a coated electrode according to some embodiments of the present disclosure.
Figure 3B:
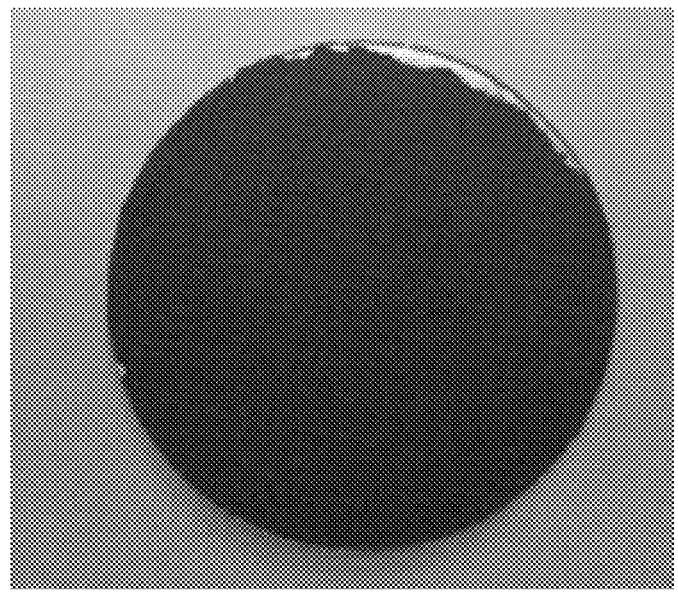
FIG. 3B depicts the coated electrode of FIG. 10A after tape adhesion testing.

In tape peeling adhesion testing, tape was pressed onto the disks, covering the whole disk area, and then peeled. Typically, two disk samples were tested for each coating condition. FIGS. 3A and 3B show a representative disk before (FIG. 3A) and after (FIG. 3B) tape adhesion testing. The disk after adhesion testing (FIG. 3B) showed no more than about 10% weight loss compared to the disk before adhesion testing (FIG. 3A). A fraction of the coating was removed at the leading edge of the disk after tape peeling. In general, the coated disk had good adhesion.

Figure 4:
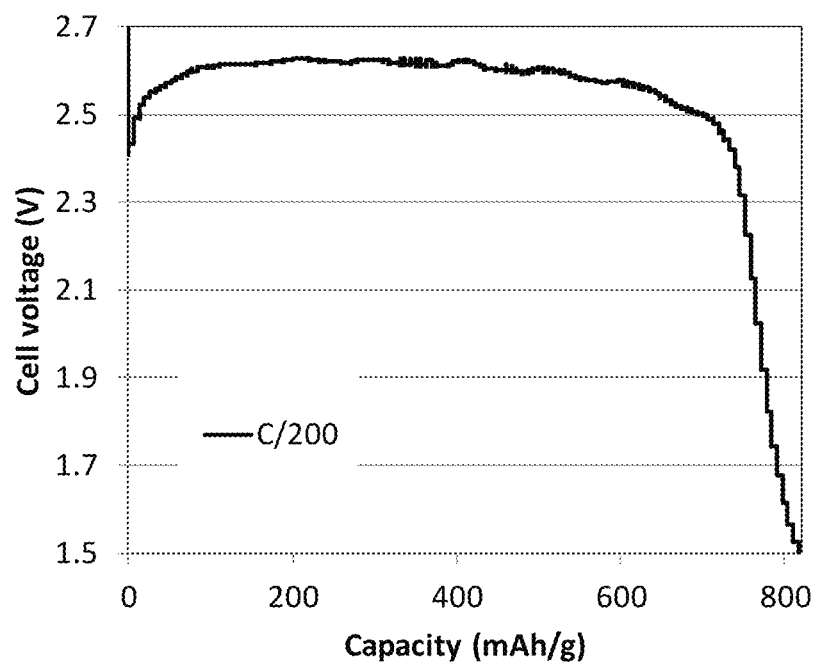
FIG. 4 depicts discharge voltage at C/200 rate at room temperature according to some embodiments of the present disclosure.

The coated electrode was fabricated into a lithium ion coin cell. FIG. 4 shows discharge voltage versus specific capacity for the lithium ion coin cell. A high specific capacity of more than about 800 mAh/g at a C/200 discharge rate was observed at room temperature.

Example 3

Figure 5:
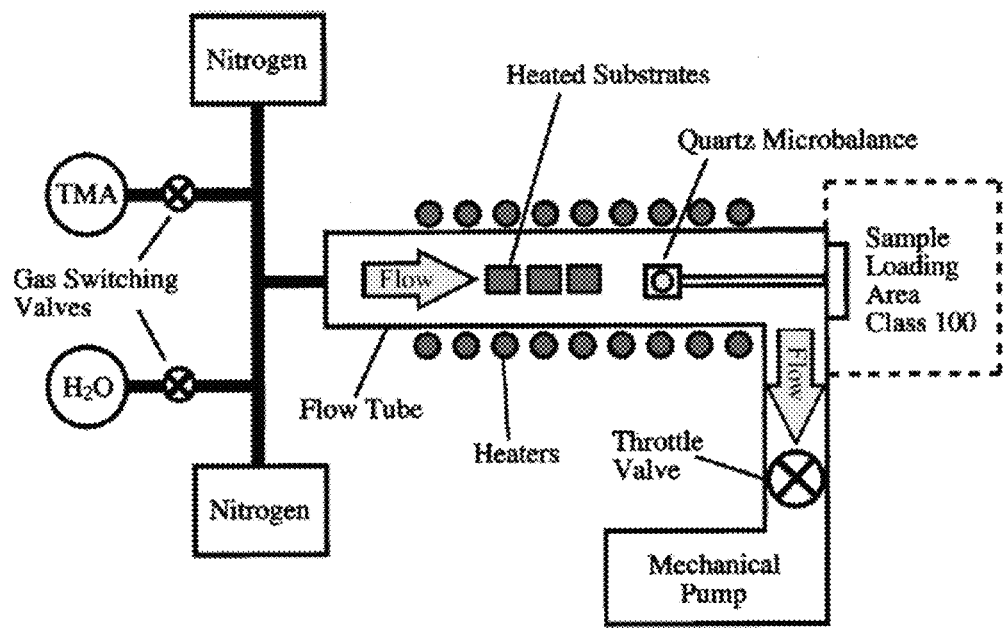
FIG. 5 depicts an atomic layer deposition scheme according to the prior art.

A method, similar to the one developed by a group from Argonne National Laboratory (J. W. Elam, M. D. Groner, and S. M. George, Rev. Sci. Instrum., Vol. 73, No. 8, August 2002), was used to deposit one monolayer of a metal oxide after another. The method can deposit by an iterative process one atomic layer of the metal oxide after another. Moreover, the method can deposit the metal oxide monolayer by a self-saturating process. Furthermore, a precise thickness of the metal oxide layer can be deposited. Precise compositional control of deposited metal oxide layer can be maintained by the method. The method typically includes a sequence of chemical reactions between gaseous precursors administered to a reactor, and functional groups present on the surfaces of primary particles. The chemical reactions result in a layer of metal oxide developing on the surfaces of the primary particles. The resulting metal oxide layer is chemically bonded to the primary particles. Moreover, the metal oxide layer typically has a substantially uniform thickness. The metal oxide can have conformal coverage over a three-dimensional, porous structure and/or electrode. The atomic layer of the metal oxide is usually deposited by a reactor. FIG. 5 depicts a typically configuration of the reactor. The reactor generally includes a microbalance, more generally the reactor includes a quartz microbalance. The mass of the monolayer deposited is usually one or more of detected and monitored by the microbalance. Generally, the microbalance can monitor the mass of the monolayer deposited in situ during the deposition process. For example, the microbalance can monitor the mass of the metal oxide material deposited. A non-limiting example of a suitable microbalance is a modified Maxtex Model BSH-150 sensor head and RC quartz crystal sensor (CNT06RCIA, Colnatec).

Conducting the deposition of the atomic layer of metal oxide by a reactor with a microbalance can reduce one or both of temperature induced transients and drift. Generally, a more uniform coating of the metal oxide can be deposited when one or both of the temperature induced transients and drift are reduced. Furthermore, the reactor commonly includes a viscous, inert gas.

Example 4

In this example, a composite electrode is prepared by applying a metal oxide or a solid electrolyte layer or both to a carbon monofluoride admixture layer positioned on current collector. The carbon monofluoride admixture layer is positioned between the current collector and the metal oxide layer. Composite electrodes having different composite coating thicknesses and quality were prepared. Furthermore, the ratio of Al:Li in the metal oxide layer can vary. For example, the metal oxide can be $Li_xAlO_y$, where x commonly can have a value from about 0.5 to about 10 and y can have a value from about 1.75 to about 6.5; more commonly x can have a value from about 1 to about 5 and y can have a value from about 2 to about 4.

The slurry-coated electrodes were cut into electrode disks and electrode strips for conformal coatings and for electrochemical performance evaluation. The electrode disks were routinely 1.2 cm in diameter. The electrode strips were generally 2 inch by 3 inch in size.

In some embodiments, the conformal coated electrodes, the conformal coated polyolefin separators, and the conformal coated glass fiber separators included one or more of a metal oxide filler. The metal oxide layer typically comprises $Li_xAlO_y$ with a Li/Al ratio or x value of about 1. The metal oxide layer were prepared by depositing atomic layers of $Al_2O_3$ (aluminum oxide) and LiOH (lithium hydroxide) individually, one after the other. The atomic layer of aluminum oxide was deposited by alternating exposures to trimethylaluminum (Aldrich, 97%) and deionized water. The atomic layer of lithium hydroxide was deposited by alternating exposures to lithium t-butoxide (Aldrich, 97%) and deionized water. Both the trimethylaluminum and water were maintained at room temperature and their vapors were dosed into the reactor through a needle valve. In contrast, lithium t-butoxide, which is a solid at room temperature, was held within a heated stainless steel bubbler and maintained at a temperature of about 140 degrees Celsius. Lithium t-butoxide was introduced into the reactor by diverting 60 sccm of an inert carrier gas (nitrogen) flow through the bubbler. The reactor was held at a temperature of about 225 degrees Celsius for the aluminum oxide atomic layer deposition. The timing sequences for the atomic layer deposition process are denoted by t1, t2, t3, and t4, in which t1 and t3 are the exposure times for precursors A and B, respectively, and t2 and t4 are the purge times following the trimethylaluminum or lithium t-butoxide exposure (labeled, "A") and deionized water (labeled, "B") exposures, respectively.

Ionic conductivity measurements and electrochemical evaluations of composite electrodes comprising a layer of metal oxide, typically $LiAlO_x$ having a Li/Al ratio of about 1, and a layer of a carbon monofluoride admixture were made. Generally, the ionic conductivity measurements and electrochemical evaluations included a separator positioned between the composite electrode and a lithium metal electrode.

The separator could be uncoated, coated with at least one ion conductor or solid electrolyte. The ion conductor or solid electrolyte is generally one or more of a metal oxide, a metal fluoride, a Garnet ion conductor, a sodium super ionic conductor, a lithium super ionic conductor, a sulfide with a lithium super ionic conductor-related structure, a lithium phosphorous oxygen nitrogen (LiPON) ion conductor, or a mixture thereof. More specifically, the metal oxide can be one or more of alkali and alkaline earth aluminum oxide. More specifically, the metal oxide or fluoride is an alkali metal aluminum oxide or fluoride, alkaline earth metal oxide or fluoride, or a mixture thereof. Still more generally, the metal oxide or fluoride is an alkali metal aluminum oxide or fluoride, or a mixture thereof. The metal oxide can be $Li_xAlO_y$, where x commonly can have a value from about 0.5 to about 10 and y can have a value from about 1.75 to about 6.5; more commonly x can have a value from about 1 to about 5 and y can have a value from about 2 to about 4. The metal oxide coated separator maintained good mechanical integrity across a broad temperature range. The upper temperature limited for the ionic conductivity measurements and electrochemical evaluations was routinely more than about 225 degrees Celsius.

Electrochemical impedance spectroscopy was utilized to conduct the electric resistivity and conductivity measurements. The separator coated with atomic layered metal oxide comprising $Li_xAlO_y$ having a Li/Al ratio or x value of about 1 and with a total thickness of about 140 μm showed a room temperature conductivity of about $2.9 \times 10^{-7}$ S/cm. The room temperature conductivity of the coated separator is consistent with the prior art conductivity of $Li_xAlO_y$.

Example 5

Electrochemical performance of a composite electrode comprising a carbon monofluoride admixture layer positioned between a current collector and a metal oxide layer, such as a metal oxide layer having a Li/Al ratio of about 1 or x value about 1 in $Li_xAlO_y$, was determined. Lithium ion coin cells were assembled with the composite electrode for electrochemical performance testing. Typically, the lithium ion coin cells contained a few drops of a non-aqueous or an aprotic, liquid electrolyte to improve lithium ion conductivity and to activate the lithium ion coin cells. Typically, the non-aqueous or aprotic liquid electrolyte was 1M $LiPF_6$ in a carbonate solvent mix. Lithium ion coin cells of three different configurations were prepared and evaluated: a control cell consisting of an assembly of a cathode having a layer of the carbon monofluoride admixture devoid of metal oxide layer, an uncoated polyolefin separator, and an anode of lithium metal; Sample I cell consisting of an assembly of a cathode having a layer of the carbon monofluoride admixture and a layer of $Li_xAlO_y$ according to Sample I conditions in Table, an uncoated polyolefin separator, and an anode of lithium metal; and Sample I with a coated polyolefin separator cell consisting of an assembly of a cathode having a layer of the carbon monofluoride admixture and a layer of $Li_xAlO_y$ according to Sample I conditions in Table, a coated polyolefin separator according to Sample I conditions in Table, and an anode of lithium metal.

Figure 6A:
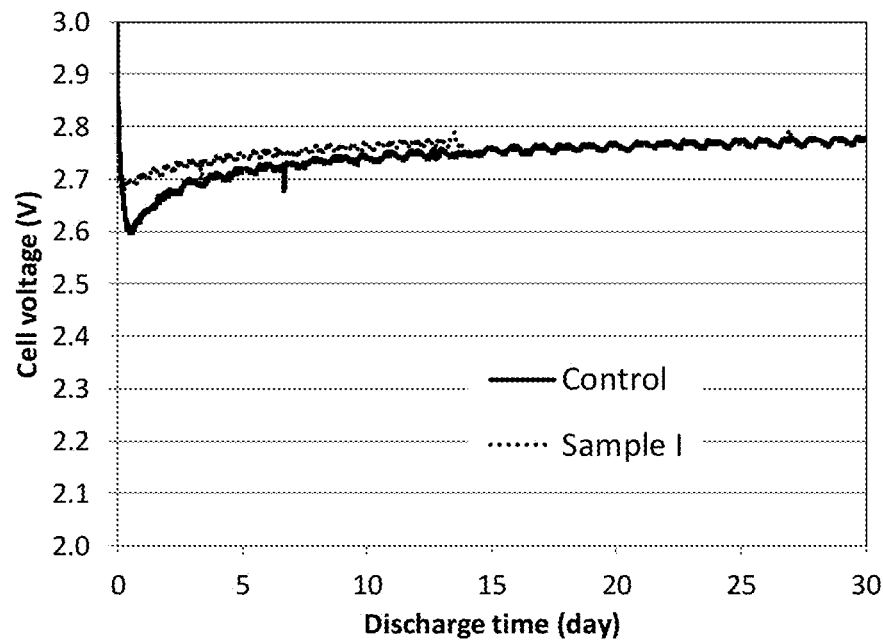
FIG. 6A depicts discharge profiles at room temperature of a control and Sample I of Table 1 according to some embodiments of the present disclosure.

A discharge rate of about C/9000 corresponding to about one-year span was applied. The discharge rate corresponds to a fast discharge current rate with respect to a twenty plus years of battery life. Under this discharge current rate, Sample I coin cells performed better than control coin cell (FIG. 6A). In particular, the Sample I coin cells did not display the characteristic carbon monofluoride voltage drop at initial discharge. The characteristic carbon monofluoride voltage drop is a deleterious performance aspect known to those skilled in the state of the art. Also, the discharge profile for the Sample I coin cell was observed to be comparable to the control coin cell after 10 days of discharging (i.e., once the control coin cell recovered from its initial voltage drop). The electrochemical performance during discharge of the Sample I coin cells show no detrimental impact of the atomic deposited metal oxide coating on the composite-coated electrodes coated having the carbon monofluoride containing admixture. Therefore, the atomic deposited metal oxide, such as $Li_xAlO_y$, is compatible with lithium metal anodes and non-aqueous or aprotic, liquid electrolytes.

Figure 6B:
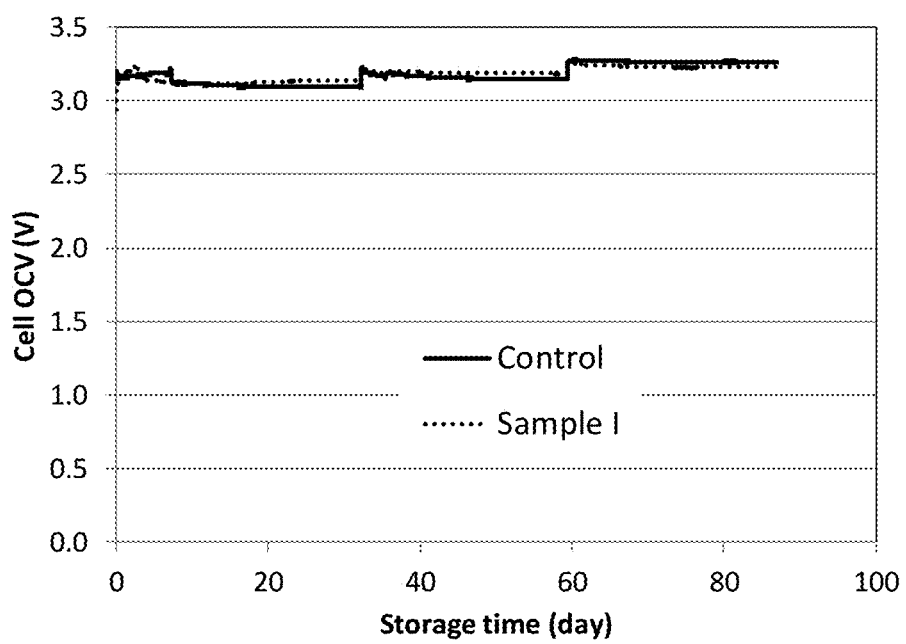
FIG. 6B depicts the open circuit voltage vs. storage time at 55 degrees Celsius of a control and Sample I of Table 1 according to some embodiments of the present disclosure, where OCV stands for open-circuit voltage.

Cell voltage self-discharge was determined for the above control, Sample I and Sample I with coated polyolefin separator coin cell configurations. Cell voltage self-discharge is an important indicator of cell storage stability. FIG. 6B shows the open circuit voltage discharge performance of a Sample I coin cell compared to a control coin cell at a storage temperature of 55 degrees Celsius. The storage temperature of 55 degrees Celsius was selected for its potential to show a differentiated performance behavior between the control coin cell, Sample I and Sample I with coated polyolefin separator coin cells by accelerating deterioration processes, such as parasitic or side reactions. After about 90 days storage at 55 degrees Celsius, the control coin cell, and the Sample I coin cell generally had nearly identical open circuit voltages. The open circuit voltage steps of the control and Sample I cells observed at 30 days and 60 days are artifacts in the data that resulted from storage suspension for the measurement of cell impedance (at those respective intervals).

Example 6

The effects of the Li:Al ratio in the metal oxide layer and the metal oxide layer thicknesses on lithium ion conductivity were determined for composite electrodes comprising a carbon monofluoride admixture layer positioned between a current collector and a metal oxide layer. Also, the effects of post processing and separator type were determined. The conformal metal oxide coated samples are summarized in the Table.

TABLE

| Conformal $Li_xAlO_y$ Coating Condition (Sample) | $Li_xAlO_y$ Coating Li:Al ratio | $Li_xAlO_y$ Coating Thickness (nm) | $Li_xAlO_y$ Coated Separator Type(s)¥ | Post Heat Treatment |
|---|---|---|---|---|
| I | 1:1 | 14 | Polyolefin | No |
| II | 1:1 | 40 | Polyolefin & glass fiber | No |
| III | 2:1 | 100 | Glass fiber | No |
| IV | 4:1 | 160 | Glass fiber | No |
| IV† | 4:1 | 160 | Glass fiber | No |
| V | 2:1 | 100 | Glass fiber | Yes |
| VI | 4:1 | 160 | Glass fiber | Yes |
| VI† | 4:1 | 160 | Glass fiber | Yes |

†Replicate for verification of results
¥Uncoated polyolefin separators were typically used in the cells, or indicated otherwise.

The glass fiber separator was obtained from Hollingsworth & Vose BG03015. The glass separator was thermally stable at a temperature of more than about 400 degrees Celsius. With the increased thermal stability at temperatures of more than about 400 degrees Celsius, cell samples could be heat treated to remove residual moisture.

Sample I did not include a non-aqueous or an aprotic lithium ion liquid electrolyte and did not develop a voltage when evaluated at room temperature. Samples II-VII were tested with and without a non-aqueous or an aprotic lithium ion liquid electrolyte. Only the test results with the non-aqueous or aprotic, lithium ion liquid electrolyte are included in the Table. Simple to Sample I, Samples II-VII did not develop a voltage when evaluated at room temperature when the non-aqueous or aprotic, lithium ion liquid electrolyte was omitted.

Figure 7:
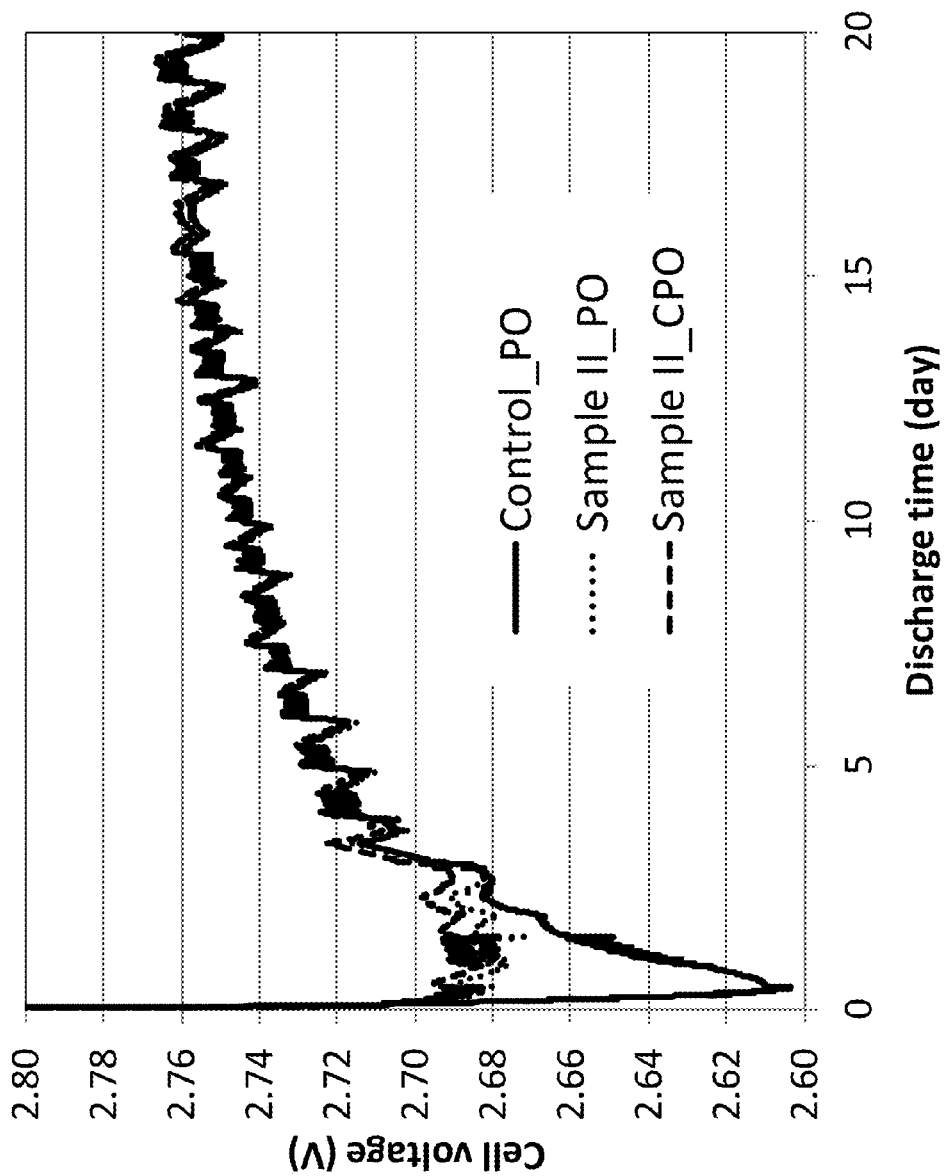
FIG. 7 depicts cell voltage versus discharge time for a control and Sample II of the Table with and without a coated separator according to some embodiments of the present disclosure, where PO stands for uncoated polyolefin separator and CPO stands for coated polyolefin separator.

FIG. 7 illustrates the short and long-term effect of increasing the metal oxide thickness form about 14 nm to about 40 nm on the composite-coated electrodes having a Li:Al ratio of 1:1 and of having polyolefin and glass separators (i.e., Sample II), where PO stands for polyolefin separator and CPO stands for $Li_xAlO_y$ coated polyolefin separator. A similar discharge profile was observed for each of the Sample II cells (including controls), when compared to our earlier findings. While each of the samples displayed the characteristic $CF_x$ voltage delay phenomenon we observed that the magnitude of this effect was significantly reduced. This finding was indeed interesting, and led to further $Li_xAlO_y$ coating optimization and investigation.

Figure 8A:
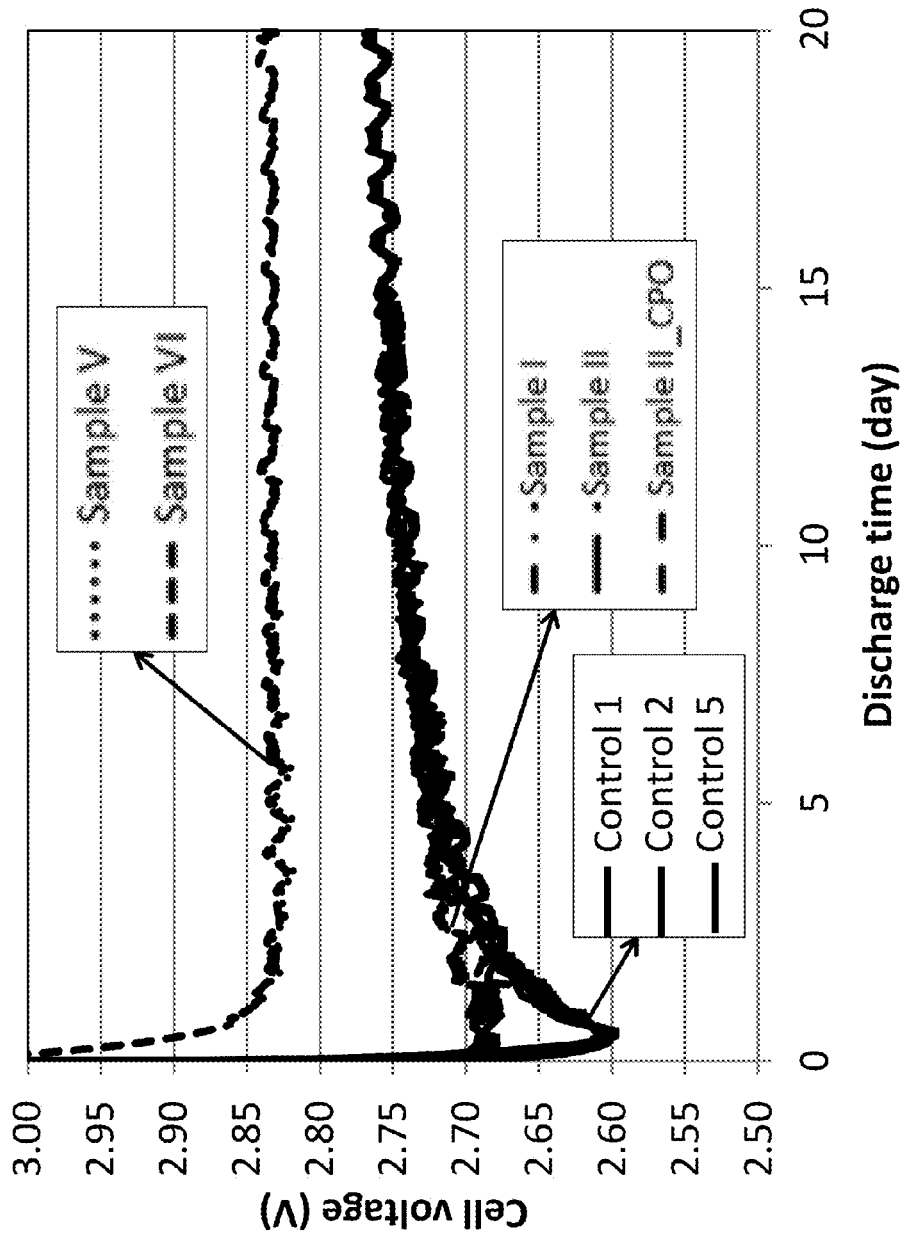
FIG. 8A depicts voltage discharge profiles of Samples I, II, V and VI of the Table and their respective controls having a polyolefin separator according to the present disclosure.
Figure 8B:
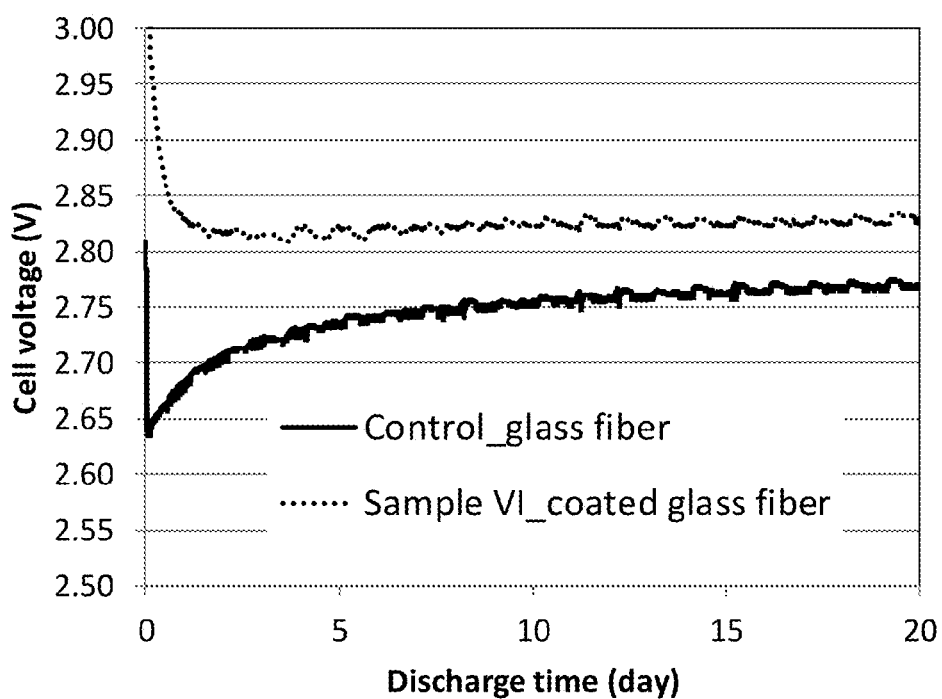
FIG. 8B depicts voltage discharge profiles of Sample VI of the Table with a coated glass fiber separator and its control having an uncoated glass fiber separator according to embodiments of the present disclosure.

FIGS. 8A and 8B show the discharge performance of composite-coated electrodes of Samples I, II, V, and VI. A discharge rate of about C/9000, corresponding to a one-year span, was applied. Three controls having electrodes coated with the carbon monofluoride admixture without an ion conducting and/or solid electrolyte layer and with uncoated polyolefin separators were evaluated in parallel (FIG. 8A). One control sample, an assembly of a cathode having a layer of the carbon monofluoride admixture, an uncoated glass fiber separator, and an anode of lithium metal, was evaluated in parallel with a composite electrode having a carbon monofluoride admixture layer and an ion conducting and/or solid electrolyte layer with a coated glass fiber separator, Sample VI, (FIG. 8B). All of the control cells displayed the characteristic voltage delay known to carbon monofluoride chemistry.

As shown in the Table, Samples I, II, III, IV and IV† were not post heat-treated. Samples V, VI, and VI† were post heat-treated. Sample I and II with uncoated PO separators and Sample II with a coated PO separator displayed a smaller voltage delay than the control cells (FIG. 8A). Similar observations were also seen in Samples III, IV and IV† (not shown). However, the post heat-treated Samples V, VI and VI† demonstrated no voltage delay (FIGS. 8A and 8B) for the respective greater discharge voltages.

It is believed that substantial reduction in the voltage delay is due the metal oxide layer on the carbon monofluoride admixture layer, in particular to one or more of greater metal oxide thickness and to a Li/Al ratio of greater than one. Without wanting to be bound by any theory, it is further believed that metal oxide layer on the carbon monofluoride admixture layer substantially reduces the large activation energy of the carbon-fluoride covalent bond. The substantial elimination of the voltage delay has the one of more of the following advantages: (1) no diminished cell power capability, which means that desirable "start-up" power capability is enabled and can be utilized in relevant applications, and (2) no need for pre-conditioning, "work around" methods, such as pre-discharging of fresh cells (burn off), that is well-known to add time and cost.

Figure 9A:
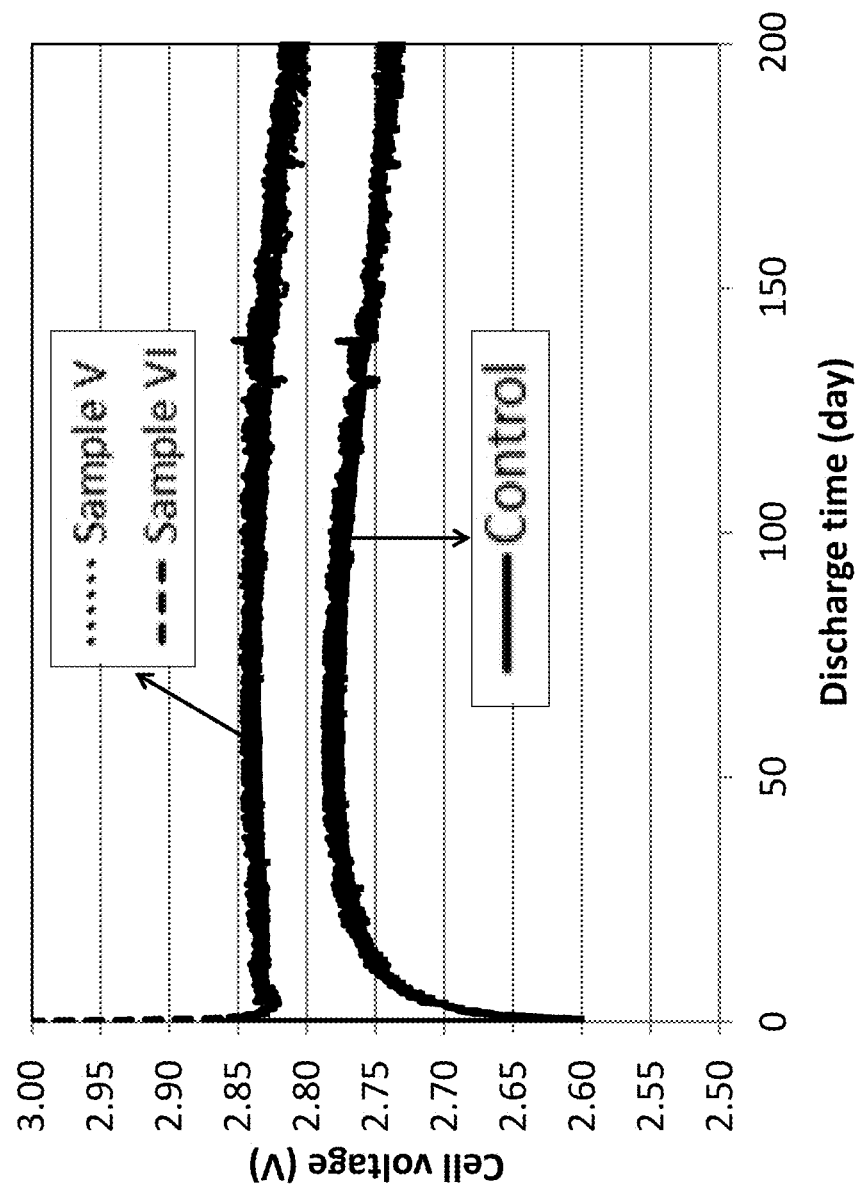
FIG. 9A depicts long-term room temperature discharge performance of Samples V and VI of the Table and their respective controls having a polyolefin separator according to some embodiments of the present disclosure.
Figure 9B:
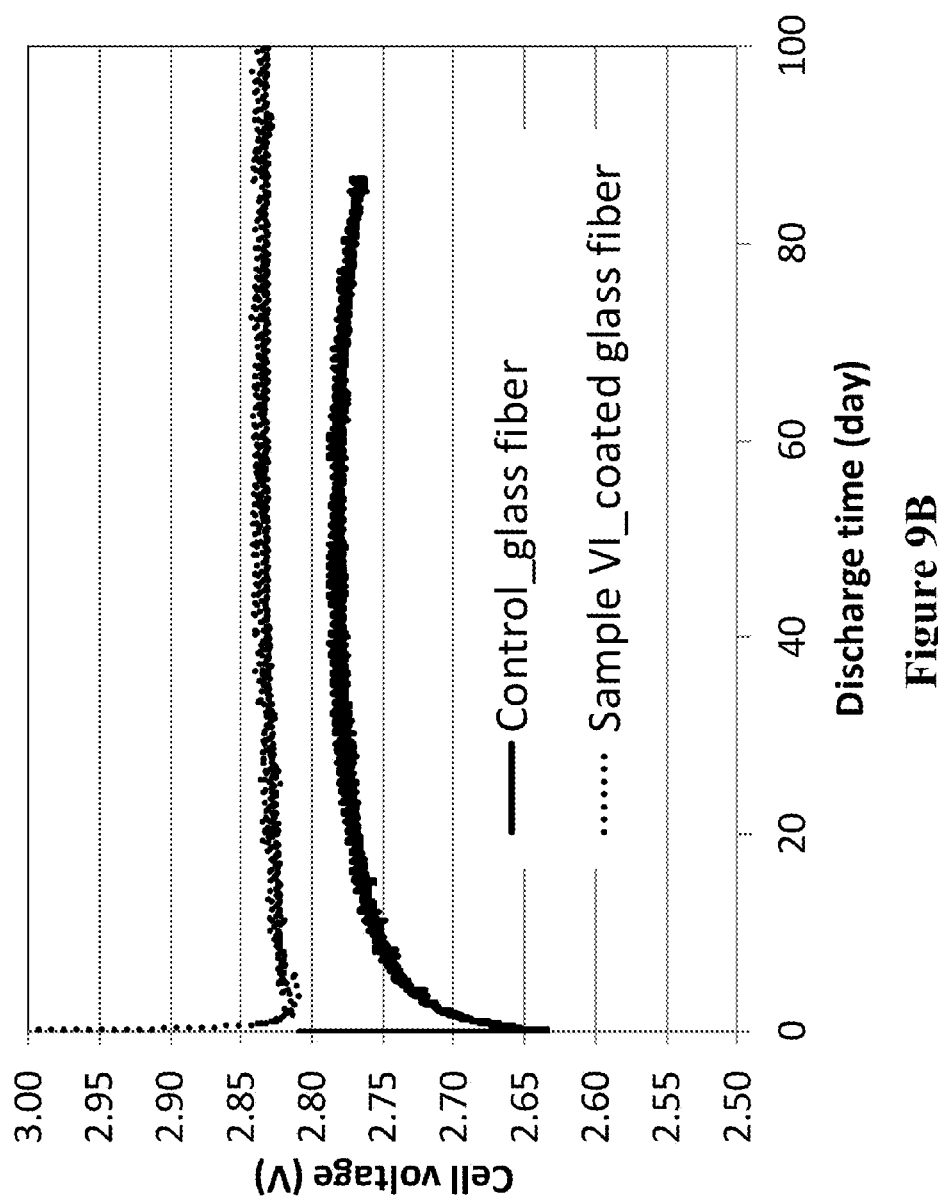
FIG. 9B depicts long-term room temperature discharge performance of Sample VI of the Table and its control having a glass fiber separator according to some embodiments of the present disclosure.

FIGS. 9A and 9B display the long-term discharge performance for Samples V and VI. Each of Sample V and VI displayed and maintained greater discharge voltages than the control Samples during long-term discharge. More specifically, Samples V and VI displayed and maintained discharge voltages greater than the control samples, which are assemblies of a cathode having a layer of the carbon monofluoride admixture, an uncoated polyolefin separator (FIG. 9A) or uncoated glass fiber separator (FIG. 9B), and an anode of lithium metal, by 60 mV or more. As noted previously, the type of separator did not appear to have an impact on cell performance and stability. This implies that thicker metal oxide coatings improved discharge performance of carbon monofluoride admixtures without compromise to overall cell impedance.

Example 7

Lithium ion coin cells fabricated with composite electrodes of Samples II, IV, IV†, V, VI and VI† were characterized by electrochemical impedance spectroscopy. More specifically, the bulk (or solution) resistance ($R_s$), charge transfer (or polarization) resistance ($R_p$) and diffusion (or Warburg) impedance ($Z_w$). The electrolyte solution and electrode resistances generally dominate the bulk resistance. Typically, the cell charge transfer kinetics at the electrode-electrolyte interface dominates the charge transfer resistance, and the ion diffusion at low frequencies most prominently contributes to the diffusion impedance. The control for electrochemical impedance studies was a lithium ion coin cell having a carbon monofluoride-coated electrode devoid of metal oxide layer.

Figure 10A:
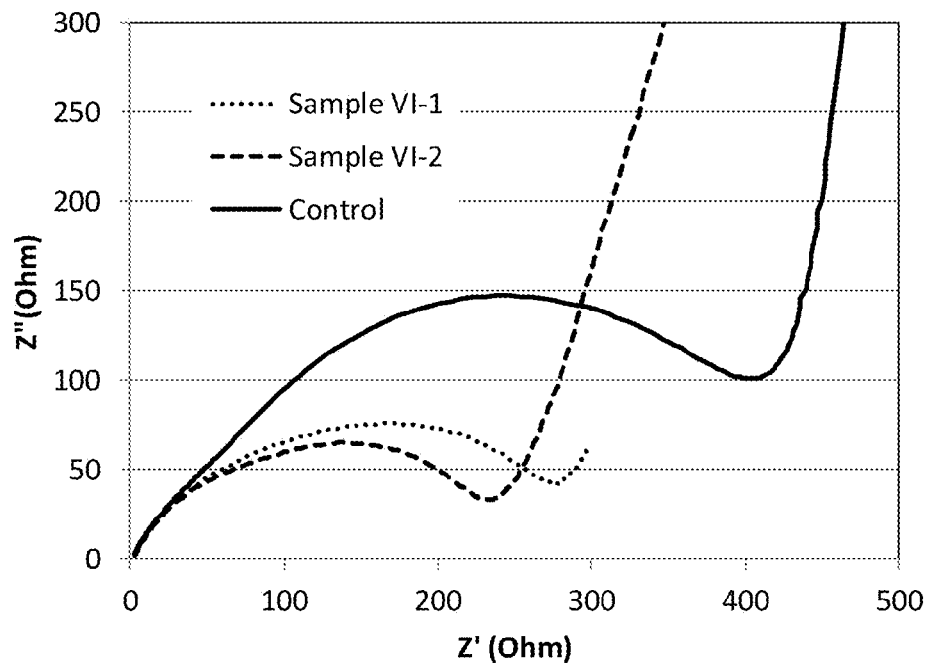
FIG. 10A depicts electrochemical impedance spectra of Sample VI of the Table and its control having a polyolefin separator according to some embodiments of the present disclosure.
Figure 10B:
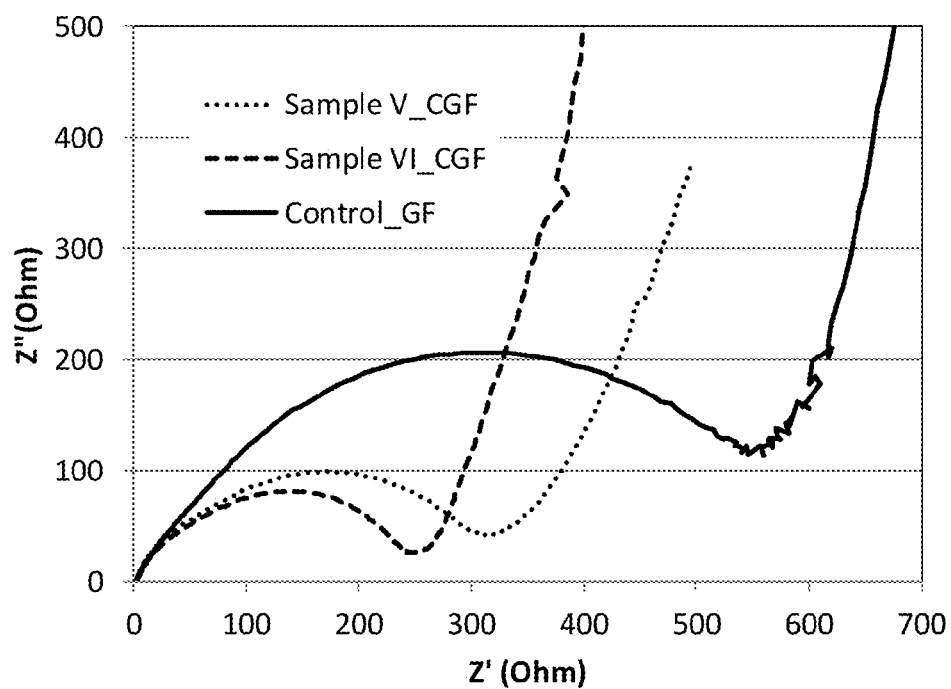
FIG. 10B depicts electrochemical impedance spectra of Samples V and VI of the Table and their respective controls having a glass fiber separator according to some embodiments of the present disclosure, where CGF stands for coated glass fiber separator.

FIGS. 10A and 10B display electrochemical impedance spectrographic plots for the lithium ion coin cells fabricated with uncoated polyolefin separators and composite electrodes coated with Samples V and VI, or uncoated polyolefin separators and the carbon monofluoride admixture electrode devoid of a metal oxide layer control, or uncoated glass fiber separators and composite electrodes coated with Samples V and VI, or carbon monofluoride admixture electrodes devoid of metal oxide layer. Nyquist plots were obtained for each of the lithium ion coin cell configurations. The Nyquist plots display the real component of the lithium ion coin cell impedance, Z', along the horizontal axis and the imaginary component of the lithium ion coin cell impedance, Z", along the vertical axis. The glass fiber separators are generally thicker than the polyolefin separators. Hence, the lithium ion coin cells having glass fiber separators had, in general, greater impedance and, therefore, different scales in FIGS. 10A and 10B in order to clearly differentiate the coated samples IV, IV†, VI and VI† from the carbon monofluoride-coated electrode devoid of metal oxide layer control. Typical responses of cell impedance as they relate to frequencies (where the data points move from the left to right along the semi-circles corresponding to from high to low frequencies) were found. At very high frequencies (up to 100 k Hz), the cell impedance is small corresponding to solution resistance, $R_s$. At very low frequencies (down to mHz), the curve becomes a straight line with an angle approximating 45 degrees, corresponding to Warburg impedance. The size of the semi-circles quantitatively represents charge transfer resistance $R_p$. The smaller $R_p$ (semi-circle) represents faster charge transfer leading to lower overall cell impedance during discharge (higher discharge cell voltage). Characteristic semi-circles were observed for each of the lithium ion coin cells of samples IV, IV†, VI and VI† that were significantly smaller than the lithium ion control cells. Specifically, the charge transfer resistance $R_p$ for lithium ion coin cell samples IV, IV†, VI and VI† with polyolefin separator was observed to be approximately 50-66% less in overall magnitude than the control, FIG. 10A. A similar result was observed for the charge transfer resistance of lithium ion coin cells having glass fiber separators, FIG. 10B. These results indicate that the composite electrodes have improved charge transfer kinetics. More specifically, that metal oxide layer of the carbon monofluoride admixture layer substantially improves the charge transfer kinetics of the composite electrodes.

Example 8

Figure 11A:
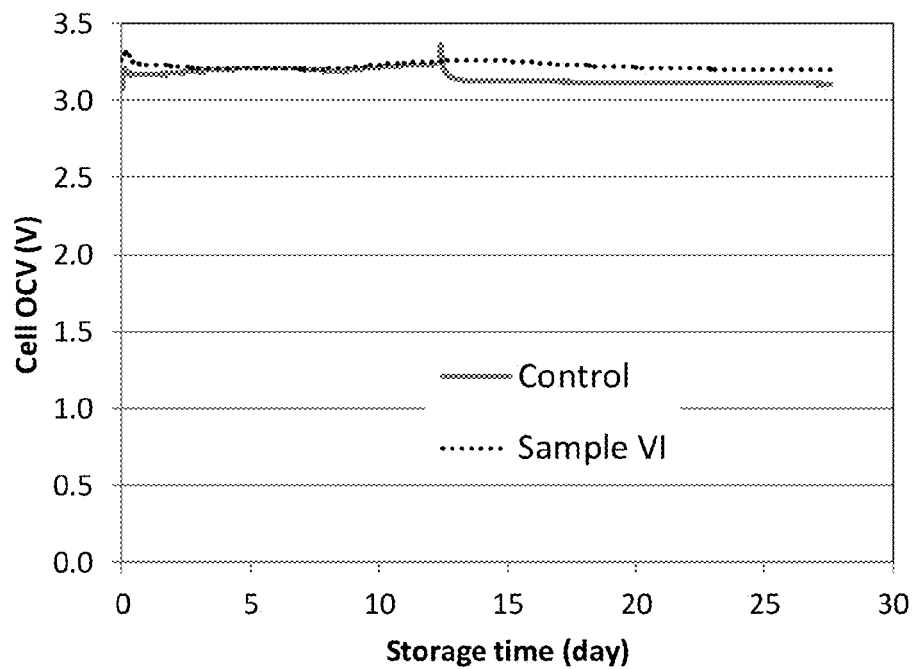
FIG. 11A depicts open circuit voltage vs. storage time for Sample VI of Table and its control at 55 degrees Celsius according to some embodiments of the present disclosure.
Figure 11B:
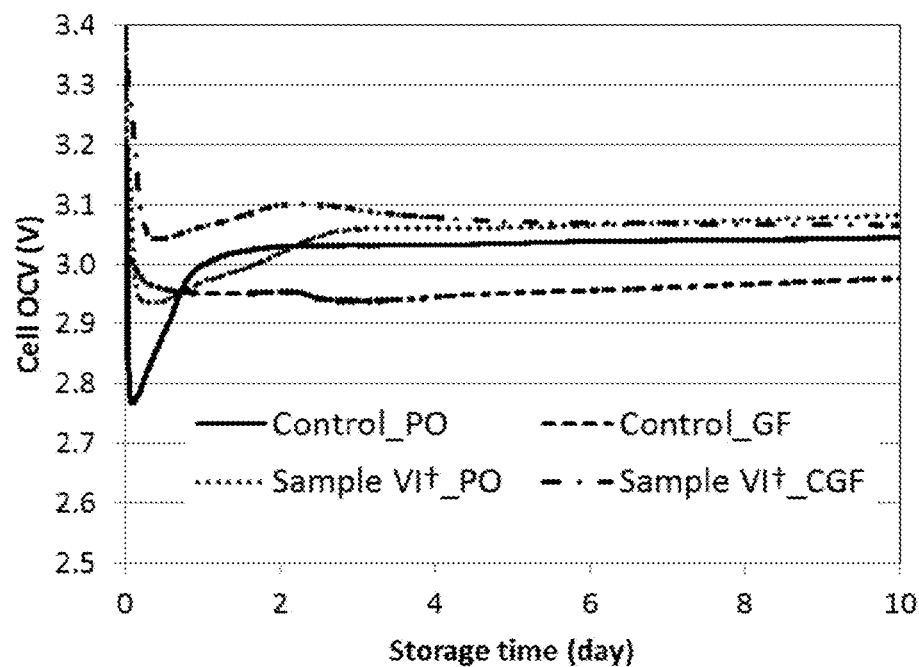
FIG. 11B depicts open circuit voltage vs. storage time for Samples IV$^\dagger$ of the Table and a control cell at 85 degrees Celsius according to some embodiments of the present disclosure, where PO and CGF stand for polyolefin separator and coated glass fiber separator, respectively.

Lithium ion coin cells were stored at an elevated temperature and discharged at room temperature after being stored at the elevated temperature. FIG. 11A displays storage data for Sample VI and control lithium ion coin cells at 55 degrees Celsius. FIG. 11B displays storage data at 85 degrees Celsius for a control lithium ion cell with uncoated polyolefin separator, a control lithium ion cell with uncoated glass fiber separator, a Sample VI† coin cell with uncoated polyolefin separator, and a Sample VI† coin cell with coated glass fiber separators. The initial open-circuit voltage data for the control cell with uncoated glass fiber separator is considered an anomaly. When stored at 85 degrees Celsius, the control coin cells experienced an initial open-circuit voltage drop, even without any discharge current applied (FIG. 11B). The coin cells having cathodes coated with Sample coating VI and VI† displayed smaller initial open-circuit voltage drops, compared with the control cells (FIG. 11B). Such open-circuit voltage drop resembles the voltage delay behavior commonly observed in Li/CF$_x$ cells, which are assemblies of a cathode having a layer of the carbon monofluoride admixture devoid of conformal metal oxide layer, an uncoated polyolefin separator, and an anode of lithium metal, during initial discharge operation. In general, the lithium ion coin cells having cathodes coated with one of Sample coatings I, II, III, IV, V, VI or VI† had greater open circuit voltages than the control lithium ion coin cells lacking the sample coating(s). Sample VI† coin cell with uncoated polyolefin separator showed smaller initial open-circuit voltage drop than the control coin cell. Sample VI† coin cell with coated glass fiber separator showed even smaller initial open-circuit voltage drop than the control coin cell. Lithium ion coin cells having a cathode coated with a layer of carbon monofluoride and a layer of metal oxide are more stable, have smaller initial open-circuit voltage drop and the higher open-circuit voltage during storage at 85 degrees Celsius than comparable lithium ion coin cells having a cathode lacking the carbon monofluoride and metal layers.

While not wanting to be bound by any theory, it is believed that parasitic side reactions, such as electrolyte oxidation at the interface of the carbon monofluoride admixture and the current collector are drastically increased at temperatures exceeding room temperature, such as at about 85 degrees Celsius or more. Moreover, it is believed that the parasitic reactions consume lithium ions in the electrolyte, which leads to concentration gradient of the lithium ions at the electrode/electrolyte interface with leads to the open-circuit voltage drop. Furthermore, parasitic side reaction products are believed to precipitate to form a solid electrolyte interface thin film on the electrode surface, which results in reduced parasitic reaction rates. The open-circuit voltage eventually recovers from the initial voltage drop and approaches a steady level due to lithium ion concentration equilibrium at the electrode/electrolyte interface over an extended period of storage time. This proposed mechanism suggests that the amount of the initial open-circuit voltage drop can be a direct measure of the coin cell's electrochemical stability at temperatures greater than room temperature.

An initial open-circuit voltage drop was not observed during storage at 55 degrees Celsius for lithium ion coin cells having a cathode coated with Sample coatings I (FIG. 6B) and VI (FIG. 11A). While not wanting to be bound by theory, it is believe that the substantial lack of an open-circuit voltage drop is due to a small level and/or extent of parasitic reactions. It is further believed that the small level and/or extent parasitic reactions may be due to the lower temperature, 55 degree Celsius storage temperature, in comparison to the storage at 85 degrees Celsius.

Figure 12:
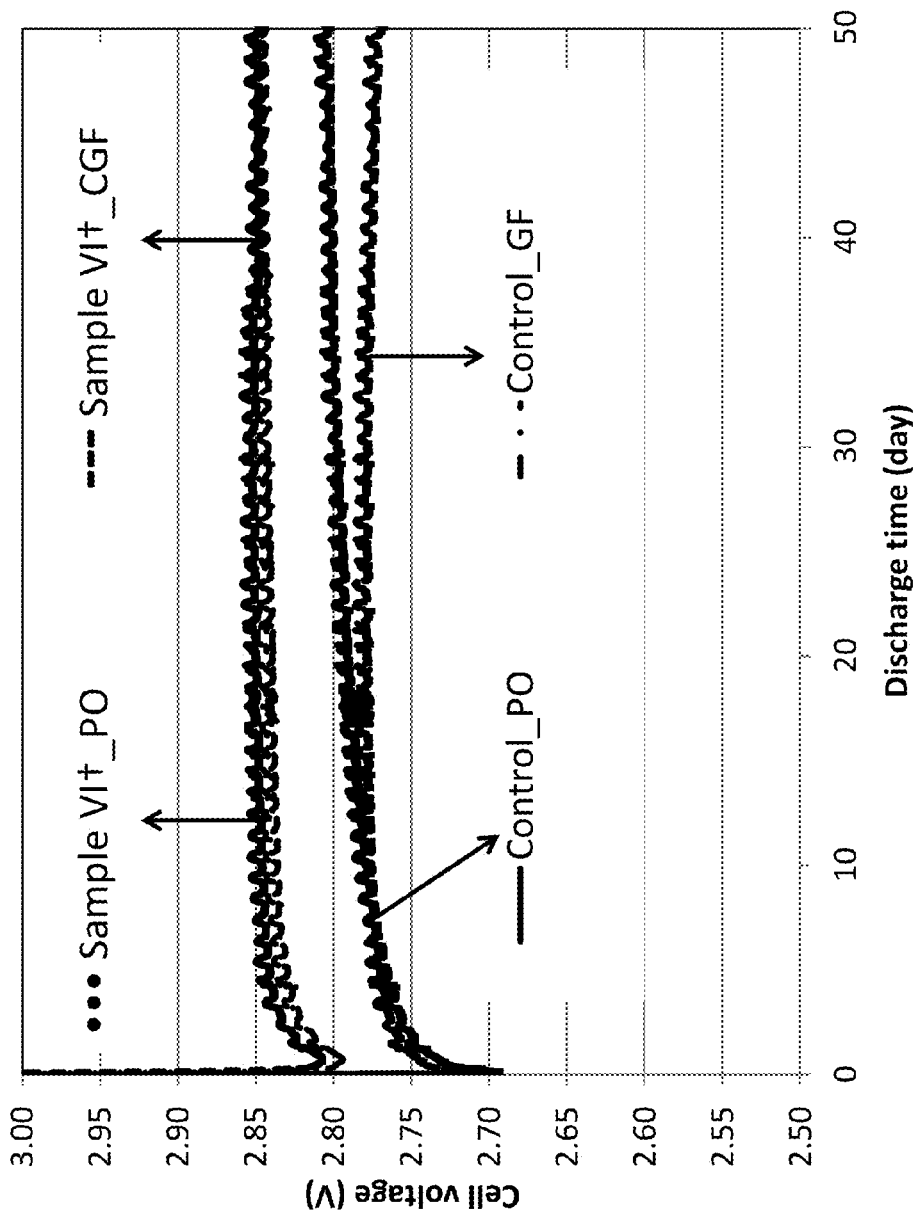
FIG. 12 depicts discharge data for Samples IV$^\dagger$ of Table 1 and their controls with a polyolefin or a glass fiber separator at room temperature after storage at 85 degrees Celsius for 11 days according to some embodiments of the present disclosure.

FIG. 12 shows the discharge data at about C/9000 rate, corresponding to about one-year discharge rate, at room temperature after coin cells were stored at 85 degrees Celsius for 11 days. Sample VI† coin cells demonstrated superior discharge performance, with reduced initial voltage delay and with a higher discharge voltage typically greater than about 70 mV, compared to the control coin cells.

A number of variations and modifications of the disclosure can be used. It would be possible to provide for some features of the disclosure without providing others.

The present disclosure, in various embodiments, configurations, or aspects, includes components, methods, processes, systems and/or apparatus substantially as depicted and described herein, including various embodiments, configurations, aspects, sub-combinations, and subsets thereof. Those of skill in the art will understand how to make and use the present disclosure after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention that the claimed material requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the disclosed description has included description(s) of one or more embodiments, configurations, or aspects and certain variations and modifications, other variations, combinations, and modifications are within the scope of the disclosure e.g., as may be within the skill and knowledge of those in the art, after understanding of the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A composition, comprising:
a carbon monofluoride admixture layer having opposing upper and lower surfaces; and one or more of an ion conducting layer and a solid electrolyte layer positioned on one of the upper or lower surfaces, wherein the one or more of the ion conducting and the solid electrolyte layers comprise one or more of a metal oxide or a metal fluoride selected from the group consisting of an alkali metal aluminum oxide, an alkali metal fluoride, an alkaline earth metal oxide, an alkaline earth fluoride, or a mixture thereof, and wherein the one or more of the ion conducting layer and the solid electrolyte layer have the following chemical composition: $M_zAlX_y$, where M is one of an alkali metal, X is one of oxygen or fluorine and z has a value from about 0.5 to about 10 and y has a value from about 1.75 to about 6.5.

2. The composition of claim 1, wherein the one or more of the ion conducting layer and the solid electrolyte layer further comprise one a Garnet ion conductor, a sodium super ionic conductor, a lithium super ionic conductor, a sulfide having a lithium super ionic conductor structure, a lithium phosphorous nitrogen ion conductor or a mixture thereof.

3. The composition of claim 1, wherein the carbon monofluoride admixture layer further comprises:
   a carbon monofluoride composition;
   a polymeric binder; and
   one or both of a conductive carbon black and a conductive graphite.

4. The composition of claim 3, wherein the polymeric binder is selected from the group consisting of poly(tetrafluoroethylene), poly(vinylidenefluoride) homopolymer, poly(vinylidenefluoride) co-polymer, styrene-butadiene rubber/carboxymethylcellulose aqueous copolymers, lithium poly(acrylic acid) aqueous polymer, or a mixture thereof.

5. The composition of claim 3, wherein the conductive carbon black is selected from the group consisting of carcass grade carbon black, furnace grade carbon black, hard carbon black, soft carbon black, thermal carbon black, acetylenic thermal carbon black, channel black, and lamp black or a mixture thereof.

6. The composition of claim 3, wherein the conductive graphite is selected from the group consisting of natural graphite, crystalline flack graphite, amorphous graphite, pyrolytic graphite, graphene, lump graphite, and graphite fiber, or a mixture thereof.

7. The composition of claim 3, wherein the carbon monofluoride admixture layer comprises from about 82 to about 98 wt % of the carbon monofluoride composition, from about 1 to about 5 wt % of the conductive carbon black, from about 0 to about 4 wt % of the conductive graphite, and from about 1 to about 9 wt % of the polymeric binder.

8. The composition of claim 3, wherein the carbon monofluoride composition comprises $CF_x$, wherein one of the following is true:
   (i) the value of x is from about 1.01 to about 1.20;
   (ii) the value of x is from about 1.05 to about 1.11; and
   (iii) the value of x is about 1.08.

9. The composition of claim 3, wherein one or both of the following are true:
   (a) the carbon monofluoride composition has a mean particle size from about 5 to about 11 μm; and
   (b) the carbon monofluoride composition has an average surface area from about 110 to about 150 $m^2/g$.

10. The composition of claim 1, wherein the one or more of the ion conducting layer and or the solid electrolyte layers have a thickness from about 1 to about 500 nm.

11. A composition, comprising:
   a carbon monofluoride admixture layer having opposing upper and lower surfaces; and one or more of an ion conducting layer and a solid electrolyte layer positioned on one of the upper or lower surfaces, wherein the one or more of the ion conducting and the solid electrolyte layers comprise one or more of a metal oxide or a metal fluoride selected from the group consisting of an alkali metal aluminum oxide, an alkali metal fluoride, an alkaline earth metal oxide, an alkaline earth fluoride, or a mixture thereof, and wherein the one of the alkali metal oxide or alkali metal fluoride layers have the following chemical composition: $Li_xAlO_y$, or $Li_xAlF_y$ where x has a value from about 0.5 to about 10 and y has a value from about 1.75 to about 6.5.

12. The composition of claim 11, wherein the one or more of the ion conducting layer and the solid electrolyte layer further comprises one of a Garnet ion conductor, a sodium super ionic conductor, a lithium super ionic conductor, a sulfide having a lithium super ionic conductor structure, a lithium phosphorous nitrogen ion conductor or a mixture thereof.

13. The composition of claim 11, wherein the carbon monofluoride admixture layer further comprises:
   a carbon monofluoride composition;
   a polymeric binder; and
   one or both of a conductive carbon black and a conductive graphite.

14. The composition of claim 13, wherein the polymeric binder is selected from the group consisting of poly(tetrafluoroethylene), poly(vinylidenefluoride) homopolymer, poly(vinylidenefluoride) co-polymer, styrene-butadiene rubber/carboxymethylcellulose aqueous copolymers, lithium poly(acrylic acid) aqueous polymer, or a mixture thereof.

15. The composition of claim 13, wherein the conductive carbon black is selected from the group consisting of carcass grade carbon black, furnace grade carbon black, hard carbon black, soft carbon black, thermal carbon black, acetylenic thermal carbon black, channel black, and lamp black or a mixture thereof.

16. The composition of claim 13, wherein the conductive graphite is selected from the group consisting of natural graphite, crystalline flack graphite, amorphous graphite, pyrolytic graphite, graphene, lump graphite, and graphite fiber, or a mixture thereof.

17. The composition of claim 13, wherein the carbon monofluoride admixture layer comprises from about 82 to about 98 wt % of the carbon monofluoride composition, from about 1 to about 5 wt % of the conductive carbon black, from about 0 to about 4 wt % of the conductive graphite, and from about 1 to about 9 wt % of the polymeric binder.

18. The composition of claim 13, wherein the carbon monofluoride composition comprises $CF_x$, wherein one of the following is true:
   (i) the value of x is from about 1.01 to about 1.20;
   (ii) the value of x is from about 1.05 to about 1.11; and
   (iii) the value of x is about 1.08.

19. The composition of claim 13, wherein one or both of the following are true:
   (a) the carbon monofluoride composition has a mean particle size from about 5 to about 11 μm; and
   (b) the carbon monofluoride composition has an average surface area from about 110 to about 150 $m^2/g$.

20. The composition of claim 11, wherein the one or more of the ion conducting layer and or the solid electrolyte layer have a thickness from about 1 to about 500 nm.

21. An electrode, comprising:
   a current collector;
   a carbon monofluoride admixture layer; and
   one or more of an ion conducting layer and a solid electrolyte layer, wherein the carbon monofluoride admixture layer is positioned between the current collector and the one or both of the ion conducing layer and the solid electrolyte layer and wherein the carbon monofluoride admixture layer is in contact with the current collector and the one or more of the ion conducting layer and the solid electrolyte layer, wherein the one or more of the ion conducting and the solid electrolyte layers comprise one or more of a metal oxide or a metal fluoride selected from the group consisting of an alkali metal aluminum oxide, an alkali metal fluoride, an alkaline earth metal oxide, an alkaline earth fluoride, or a mixture thereof, and wherein the one or more of the ion conducting layer and the solid electrolyte layer have the following chemical composition: $M_zAlX_y$, where M is one of an alkali metal, X is one of oxygen or fluorine and z has a value from about 0.5 to about 10 and v has a value from about 1.75 to about 6.5.

22. The electrode of claim 21, wherein the current collector comprises one of aluminum, nickel, titanium, stainless steel, carbon coated aluminum, carbon coated nickel, carbon coated titanium, or carbon coated stainless steel.

23. The electrode of claim 21, wherein the electrode one or more of receives electrons, dispenses electrons, and stores electrons.

24. A device, comprising:
first and second electrodes, wherein one or both of the first and second electrodes comprise:
 a current collector;
 a carbon monofluoride admixture layer; and
 one or more of an ion conducting layer and a solid electrolyte layer, wherein the carbon monofluoride admixture layer is positioned between the current collector and the one or more of the ion conducting layer and the solid electrolyte layer and wherein the carbon monofluoride admixture layer is in contact with the current collector and the one or more of the ion conducting layer and the solid electrolyte layer, wherein the one or more of the ion conducting and the solid electrolyte layers comprise one or more of a metal oxide or a metal fluoride selected from the group consisting of an alkali metal aluminum oxide, an alkali metal fluoride, an alkaline earth metal oxide, an alkaline earth fluoride, or a mixture thereof, and wherein the one or more of the ion conducting layer and the solid electrolyte layer have the following chemical composition: $M_zAlX_y$, where M is one of an alkali metal, X is one of oxygen or fluorine and z has a value from about 0.5 to about 10 and y has a value from about 1.75 to about 6.5;
a separator positioned between the first and second electrodes; and
an electrolyte in contact with the first and second electrodes and the separator.

25. The device of claim 24, wherein the separator is selected from the group consisting of polymer films including polyolefin such as polyethylene, polypropylene, poly(tetrafluoroethylene), polyvinyl chloride, nonwoven fibers including cotton, nylon, polyesters, glass, and naturally occurring substances including rubber, asbestos, and wood, or a mixture thereof.

26. The device of claim 24, wherein the separator has a coating layer, wherein the coating layer and the one or more of the ion conducting layer or the solid electrolyte layer have substantially the same chemical composition.

27. The device of claim 24, wherein the electrolyte comprises a lithium ion electrolyte, wherein the lithium ion electrolyte is selected from the group consisting of a non-aqueous electrolyte, an aprotic liquid electrolyte, a room temperature ionic liquid electrolyte, a polymeric electrolyte, a polymeric gel electrolyte, a solid state electrolyte, or a mixture thereof.

28. An electrode, comprising:
a current collector;
a carbon monofluoride admixture layer; and
one or more of an ion conducting layer and a solid electrolyte layer, wherein the carbon monofluoride admixture layer is positioned between the current collector and the one or both of the ion conducing layer and the solid electrolyte layer and wherein the carbon monofluoride admixture layer is in contact with the current collector and the one or more of the ion conducting layer and the solid electrolyte layer, wherein the one or more of the ion conducting and the solid electrolyte layers comprise one or more of a metal oxide or a metal fluoride selected from the group consisting of an alkali metal aluminum oxide, an alkali metal fluoride, an alkaline earth metal oxide, an alkaline earth fluoride, or a mixture thereof, and wherein the one of the alkali metal oxide or alkali metal fluoride layer has the following chemical composition: $Li_xAlO_y$, or $Li_xAlF_y$ where x has a value from about 0.5 to about 10 and y has a value from about 1.75 to about 6.5.

29. The electrode of claim 28, wherein the current collector comprises one of aluminum, nickel, titanium, stainless steel, carbon coated aluminum, carbon coated nickel, carbon coated titanium, or carbon coated stainless steel.

30. The electrode of claim 28, wherein the electrode one or more of receives electrons, dispenses electrons, and stores electrons.

31. A device, comprising:
first and second electrodes, wherein one or both of the first and second electrodes comprise:
 a current collector;
 a carbon monofluoride admixture layer; and
 one or more of an ion conducting layer and a solid electrolyte layer, wherein the carbon monofluoride admixture layer is positioned between the current collector and the one or more of the ion conducting layer and the solid electrolyte layer and wherein the carbon monofluoride admixture layer is in contact with the current collector and the one or more of the ion conducting layer and the solid electrolyte layer, wherein the one or more of the ion conducting and the solid electrolyte layers comprise one or more of a metal oxide or a metal fluoride selected from the group consisting of an alkali metal aluminum oxide, an alkali metal fluoride, an alkaline earth metal oxide, an alkaline earth fluoride, or a mixture thereof, and wherein the one of the alkali metal oxide or alkali metal fluoride layer has the following chemical composition: $Li_xAlO_y$ or $Li_xAlF_y$ where x has a value from about 0.5 to about 10 and y has a value from about 1.75 to about 6.5;
a separator positioned between the first and second electrodes; and
an electrolyte in contact with the first and second electrodes and the separator.

32. The device of claim 31, wherein the separator is selected from the group consisting of polymer films including polyolefin such as polyethylene, polypropylene, poly(tetrafluoroethylene), polyvinyl chloride, nonwoven fibers including cotton, nylon, polyesters, glass, and naturally occurring substances including rubber, asbestos, and wood, or a mixture thereof.

33. The device of claim 31, wherein the separator has a coating layer, wherein the coating layer and the one or more of the ion conducting layer or the solid electrolyte layer have substantially the same chemical composition.

34. The device of claim 31, wherein the electrolyte comprises a lithium ion electrolyte, wherein the lithium ion electrolyte is selected from the group consisting of a non-aqueous electrolyte, an aprotic liquid electrolyte, a room temperature ionic liquid electrolyte, a polymeric electrolyte, a polymeric gel electrolyte, a solid state electrolyte, or a mixture thereof.

* * * * *